(12) United States Patent
Park et al.

(10) Patent No.: US 11,921,502 B2
(45) Date of Patent: *Mar. 5, 2024

(54) REGRESSION-BASED LINE DETECTION FOR AUTONOMOUS DRIVING MACHINES

(71) Applicant: NVIDIA Corporation, Santa Clara, CA (US)

(72) Inventors: Minwoo Park, Saratoga, WA (US); Xiaolin Lin, Sunnyvale, CA (US); Hae-Jong Seo, San Jose, CA (US); David Nister, Bellevue, WA (US); Neda Cvijetic, East Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,012

(22) Filed: Jan. 6, 2023

(65) Prior Publication Data

US 2023/0152801 A1 May 18, 2023

Related U.S. Application Data

(63) Continuation of application No. 16/514,230, filed on Jul. 17, 2019, now Pat. No. 11,604,944.

(Continued)

(51) Int. Cl.
*G05D 1/00* (2006.01)
*G05D 1/02* (2020.01)
(Continued)

(52) U.S. Cl.
CPC ......... *G05D 1/0077* (2013.01); *G05D 1/0088* (2013.01); *G06F 18/2155* (2023.01);
(Continued)

(58) Field of Classification Search
None
See application file for complete search history.

(56) References Cited

U.S. PATENT DOCUMENTS 8,073,279 B2 * 12/2011 Riley ................. G06T 5/50
382/254
8,558,884 B2 * 10/2013 Ingram, Jr. ........... G01N 15/06
348/135
(Continued)

FOREIGN PATENT DOCUMENTS

CN 106290090 A * 1/2017
CN 106290090 A1 1/2017
(Continued)

OTHER PUBLICATIONS

Park, Minwoo; Applicant-Initiated Interview Summary for U.S. Appl. No. 16/514,230, filed Jul. 17, 2019, dated Aug. 29, 2022, 2 pgs.

(Continued)

*Primary Examiner* — Mohammed Rachedine
(74) *Attorney, Agent, or Firm* — Taylor English Duma L.L.P.

(57) ABSTRACT

In various examples, systems and methods are disclosed that preserve rich spatial information from an input resolution of a machine learning model to regress on lines in an input image. The machine learning model may be trained to predict, in deployment, distances for each pixel of the input image at an input resolution to a line pixel determined to correspond to a line in the input image. The machine learning model may further be trained to predict angles and label classes of the line. An embedding algorithm may be used to train the machine learning model to predict clusters of line pixels that each correspond to a respective line in the input image. In deployment, the predictions of the machine learning model may be used as an aid for understanding the (Continued)

surrounding environment—e.g., for updating a world model—in a variety of autonomous machine applications.

20 Claims, 17 Drawing Sheets

Related U.S. Application Data

(60) Provisional application No. 62/699,669, filed on Jul. 17, 2018.

(51) Int. Cl.

| | | |
|---|---|---|
| *G06F 18/214* | (2023.01) | |
| *G06F 18/23* | (2023.01) | |
| *G06F 18/2411* | (2023.01) | |
| *G06N 3/04* | (2023.01) | |
| *G06N 3/08* | (2023.01) | |
| *G06V 10/44* | (2022.01) | |
| *G06V 10/48* | (2022.01) | |
| *G06V 10/75* | (2022.01) | |
| *G06V 10/764* | (2022.01) | |
| *G06V 10/766* | (2022.01) | |
| *G06V 10/776* | (2022.01) | |
| *G06V 10/82* | (2022.01) | |
| *G06V 10/94* | (2022.01) | |
| *G06V 20/56* | (2022.01) | |

(52) U.S. Cl.
CPC .......... *G06F 18/23* (2023.01); *G06F 18/2411* (2023.01); *G06N 3/0418* (2013.01); *G06V 10/457* (2022.01); *G06V 10/48* (2022.01); *G06V 10/751* (2022.01); *G06V 10/764* (2022.01); *G06V 10/776* (2022.01); *G06V 10/82* (2022.01); *G06V 10/955* (2022.01); *G06V 20/588* (2022.01); *G05D 2201/0213* (2013.01)

(56) References Cited

U.S. PATENT DOCUMENTS

| | | | |
|---|---|---|---|
| 10,628,671 B2* | 4/2020 | Zang | G03B 15/006 |
| 10,885,698 B2 | 1/2021 | Muthler et al. | |
| 11,017,262 B2* | 5/2021 | Yamada | G06V 10/955 |
| 11,334,086 B2* | 5/2022 | Wang | G05D 1/0274 |
| 11,604,944 B2 | 3/2023 | Park et al. | |
| 2013/0051519 A1 | 2/2013 | Yang et al. | |
| 2014/0270332 A1* | 9/2014 | Pacifici | G06T 5/001 |
| | | | 382/100 |
| 2016/0321074 A1 | 11/2016 | Hung et al. | |
| 2016/0335795 A1 | 11/2016 | Flynn et al. | |
| 2017/0330319 A1 | 11/2017 | Xu et al. | |
| 2018/0121273 A1 | 5/2018 | Fortino et al. | |
| 2018/0370540 A1 | 12/2018 | Yousuf et al. | |
| 2019/0266418 A1 | 8/2019 | Xu et al. | |
| 2020/0043136 A1* | 2/2020 | Nagare | G06T 7/90 |
| 2023/0333553 A1 | 10/2023 | Park et al. | |

FOREIGN PATENT DOCUMENTS

| | | | | |
|---|---|---|---|---|
| CN | 106682675 | A | | 5/2017 |
| CN | 107085585 | A | | 8/2017 |
| CN | 107958460 | A | | 4/2018 |
| CN | 111006761 | A | * | 4/2020 |
| CN | 111006761 | A1 | | 4/2020 |
| CN | 111402162 | A | * | 7/2020 |
| CN | 111402162 | A1 | | 7/2020 |
| EP | 3171297 | A1 | | 5/2017 |
| WO | 2010115228 | A1 | | 10/2010 |
| WO | WO-2010115228 | A1 | * | 10/2010 ............ G06T 5/003 |

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

Park, Minwoo; Notice of Allowance for U.S. Appl. No. 16/514,230, filed Jul. 17, 2019, dated Dec. 7, 2022, 26 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

"Tensorflow", Retrieved from the Internet URL: :https://github.com/tensorflow/tensorflow/blob/master/tensorflow/core/kernels/hinge-loss.h, accessed on May 16, 2019, pp. 1-4.

"tf.losses.get_regularization_loss", TensorFlow Core 1.13, Retrieved from the Internet URL : https://www.tensorflow.org/api_docs/python/tf/losses/get_regularization_loss, accessed on May 16, 2019, pp. 1-1.

"tf.while_loop much slower than static graph? #9527", tensorflow, Retrieved from the Internet URL : https://github.com/tensorflow/tensorflow/issues/9527, accessed on May 16, 2019, pp. 1-7.

Cheng, G., et al., "Automatic Road Detection and Centerline Extraction via Cascaded End-to-End Convolutional Neural Network", IEEE Transactions on Geoscience and Remote Sensing vol. 55, No. 6, pp. 3322-3337 (Jun. 1, 2017).

John, V., et al., "Real-time road surface and semantic lane estimation using deep features", Signal, Image and Video Processing, vol. 12, pp. 1133-1140 (Mar. 8, 2018).

Kokkinos, I., "Pushing the Boundaries of Boundary Detection using Deep Learning", Retrieved from the Internet: URL:http:/arxiv.org/pdf/1511.07386v2.pdf, pp. 1-12 (2016).

International Search Report and Written Opinion received for PCT Patent Application No. PCT/US2019/042225, dated Oct. 18, 2019, 11 pages.

International Preliminary Report on Patentability received for PCT Patent Application No. PCT/US2019/042225, dated Jan. 28, 2021, 9 pages.

International Search Report and Written Opinion received for PCT Patent Application No. PCT/US2020/062869, dated Mar. 17, 2021, 11 pages.

Yang, Z., "Research on Lane Recognition Algorithm Based on Deep Learning", International Conference on Artificial Intelligence and Advanced Manufacturing (AIAM), IEEE, pp. 387-391 (2019).

"Conservative Control for Zone Driving of Autonomous Vehicles Using Safe Time of Arrival", U.S. Appl. No. 62/628,831, filed Feb. 9, 2018.

"Convolutional Neural Networks to Detect Drivable Freespace for Autonomous Vehicles", U.S. Appl. No. 62/643,665, filed Mar. 15, 2018.

"Deep Learning for Path Detection in Autonomous Vehicles", U.S. Appl. No. 62/684,328, filed Jun. 13, 2018.

"Deep Neural Network for Estimating Depth from Stereo Using Semi-Supervised Learning", U.S. Appl. No. 62/646,148, filed Mar. 21, 2018.

"Distance Based Ambient Occlusion Filter for Denoising Ambient Occlusions", U.S. Appl. No. 62/644,601, filed Mar. 19, 2018.

"Energy Based Reflection Filter for Denoising Ray-Traced Glossy Reflections", U.S. Appl. No. 62/644,386, filed Mar. 17, 2018.

"Geometric Shadow Filter for Denoising Ray-Traced Shadows", U.S. Appl. No. 62/644,385, filed Mar. 17, 2018.

"Method and System of Remote Operation of a Vehicle Using an Immersive Virtual Reality Environment", U.S. Appl. No. 62/648,493, filed Mar. 27, 2018.

(56) References Cited

OTHER PUBLICATIONS

"Methodology of Using a Single Controller (ECU) For a Fault-Tolerant/Fail-Operational Self-Driving System", U.S. Appl. No. 62/524,283, filed Jun. 23, 2017.
"Methods for accurate real-time object detection and for determining confidence of object detection suitable for D autonomous vehicles", U.S. Appl. No. 62/631,781, filed Feb. 18, 2018.
"Pruning Convolutional Neural Networks for Autonomous Vehicles and Robotics", U.S. Appl. No. 62/630,445, filed Feb. 14, 2018.
"System and Method for Autonomous Shuttles, Robo-Taxis, Ride-Sharing and On-Demand Vehicles", U.S. Appl. No. 62/635,503, filed Feb. 26, 2018.
"System and Method for Controlling Autonomous Vehicles", U.S. Appl. No. 62/614,466, filed Jan. 17, 2018.
"System and Method for Safe Operation of Autonomous Vehicles", U.S. Appl. No. 62/625,351, filed Feb. 2, 2018.
"System and Method for Sharing Camera Data Between Primary and Backup Controllers in Autonomous Vehicle Systems", U.S. Appl. No. 62/629,822, filed Feb. 13, 2018.
"System and Method for Training, Testing, Verifying, and Validating Autonomous and Semi-Autonomous Vehicles", U.S. Appl. No. 62/648,399, filed Mar. 27, 2018.
"System and Methods for Advanced AI-Assisted Vehicles", U.S. Appl. No. 62/648,358, filed Mar. 26, 2018.
"System and Methods for Virtualized Intrusion Detection and Prevent System in Autonomous Vehicles", U.S. Appl. No. 62/682,803, filed Jun. 8, 2018.
"Systems and Methods for Safe and Reliable Autonomous Vehicles", U.S. Appl. No. 62/584,549, filed Nov. 10, 2017.
"Video Prediction Using Spatially Displaced Convolution", U.S. Appl. No. 62/646,309, filed Mar. 21, 2018.
Adaptive Occlusion Sampling of Rectangular Area Lights with Voxel Cone Tracing, U.S. Appl. No. 62/644,806, filed Mar. 19, 2018.
TensorFlow Authors, "Implementation of Control Flow in TensorFlow", pp. 1-18, (Nov. 4, 2016).
"Video Prediction Using Spatially Displaced Convolution", U.S. Appl. No. 62/647,545, filed Mar. 23, 2018.
Park, Minwoo; First Office Action for Chinese Patent Application No. 201980061007.5, filed Mar. 17, 2021, dated Sep. 29, 2023, 8 pgs.

* cited by examiner

REGRESSION-BASED LINE DETECTION FOR AUTONOMOUS DRIVING MACHINES

CROSS-REFERENCE TO RELATED APPLICATIONS

This application is a continuation of U.S. patent application Ser. No. 16/514,230, filed Jul. 17, 2019, which claims the benefit of U.S. Provisional Application No. 62/699,669, filed on Jul. 17, 2018. Each of which is hereby incorporated by reference in its entirety.

BACKGROUND

The ability to accurately and precisely detect lane lines, lane edges, road boundaries, text, and/or other features in an environment is imperative for autonomous machine applications at all levels of autonomy—e.g., semi-autonomous vehicles to fully-autonomous vehicles. Due to the variation in road marking quality, geographical differences in lane and road marking conventions, as well as road marking obstructions, degradation, and/or occlusion due to wear and tear, weather conditions, lighting conditions, temporary markings (e.g., due to construction or disaster relief), and/or the like, the diversity of lane markings that can be encountered in the environment during driving is very high.

Some conventional approaches to lane or line detection have used deep neural network (DNN) processing, where high-resolution images of driving surfaces and associated annotations of lanes and lines are used to train the DNN (e.g., a convolutional neural network (CNN)) to recognize lane lines. These conventional approaches have trained the DNN to generate a segmentation mask showing a general position of lane lines in an image by classifying each pixel of the image as either part of a lane line, or not. However, these conventional approaches suffer from a loss of resolution at the output of the DNN as a result of the incremental down-sampling performed by the DNN during DNN processing through convolutional operations. For example, as a result of down-sampling, individual pixels that corresponded to lane lines at an input resolution of the DNN may become blurred pixel blobs at the output resolution of the DNN. This loss of critical spatial information for inferring the lane lines or edges reduces the precision and accuracy of lane or line detection.

In addition, conventional systems that use the DNNs to predict lane or line classes require a separate output channel (e.g., a separate prediction) for each class. As such, the DNNs of these conventional system are required to separately process and generate a prediction for each pixel for each output channel. Using this approach, the run-time of the system is increased, thereby making real-time deployment for lane or line prediction a burdensome task that requires additional compute resources, energy, and processing power. These conventional systems also employ significant post-processing steps that require using the segmentation masks output by the DNN—at the lower resolution where spatial information has been lost—to reconstruct the lanes or lines. However, this approach not only increases processing times at run-time, but also results in less accurate final predictions of lanes and lines by the system. Ultimately, the predictions of the DNNs of these conventional systems impact the ability of the autonomous vehicle to gain an accurate and precise understanding of the driving surface—in real-time—while requiring significant processing, energy, and compute resources.

SUMMARY

Embodiments of the present disclosure relate to regression-based line detection for autonomous driving machines. Systems and methods are disclosed that preserve rich spatial information through a deep-learning model by providing compressed information at a down-sized spatial resolution or dimension as compared to a spatial resolution or dimension of an input image. As such, embodiments of the present disclosure relate to line detection for autonomous driving machines including, but not limited to, lane lines, road boundaries, text on roads, or signage (e.g., poles, street signs, etc.).

In contrast to conventional systems, such as those described above, the system of the present disclosure may train a machine learning model to predict distances—one-dimensional (1D) or two-dimensional (2D)—for each pixel of an input image at an input resolution to a line pixel (or pixel corresponding to any other label class) determined to correspond to a line (or other label class) in the input image. As a result, even though the output resolution of the machine learning model may be less than the input resolution (e.g., two times less, four times less, etc.), the distances may be used to preserve the spatial information of the input resolution in order to precisely recreate the line at the input resolution. As such, by generating predictions at a lower, output resolution using the higher, input resolution for processing, the run-time of the system is decreased, while the preservation of the spatial information maintains the accuracy of predictions.

In addition to the location of line pixels, an angle of the line at the location of each line pixel may be computed by the machine learning model to aid the system in understanding the overall geometry of the line—thereby increasing the accuracy of line recreation for use by the system. To further decrease run-time for real-time operation of the system, the machine learning model(s) may be trained to predict label classes using a bit encoding process, thereby removing the constraint of conventional systems that require a prediction for each pixel for each output channel (e.g., for each class). In further contrast to conventional systems—and to reduce the overall post-processing burden of the system—the machine learning models may be trained to predict clusters of line pixels using an embedding algorithm, where each cluster corresponds to an individual line.

BRIEF DESCRIPTION OF THE DRAWINGS

The present systems and methods for regression-based line detection for autonomous driving machines are described in detail below with reference to the attached drawing figures, wherein.

DETAILED DESCRIPTION

Figure 1A:
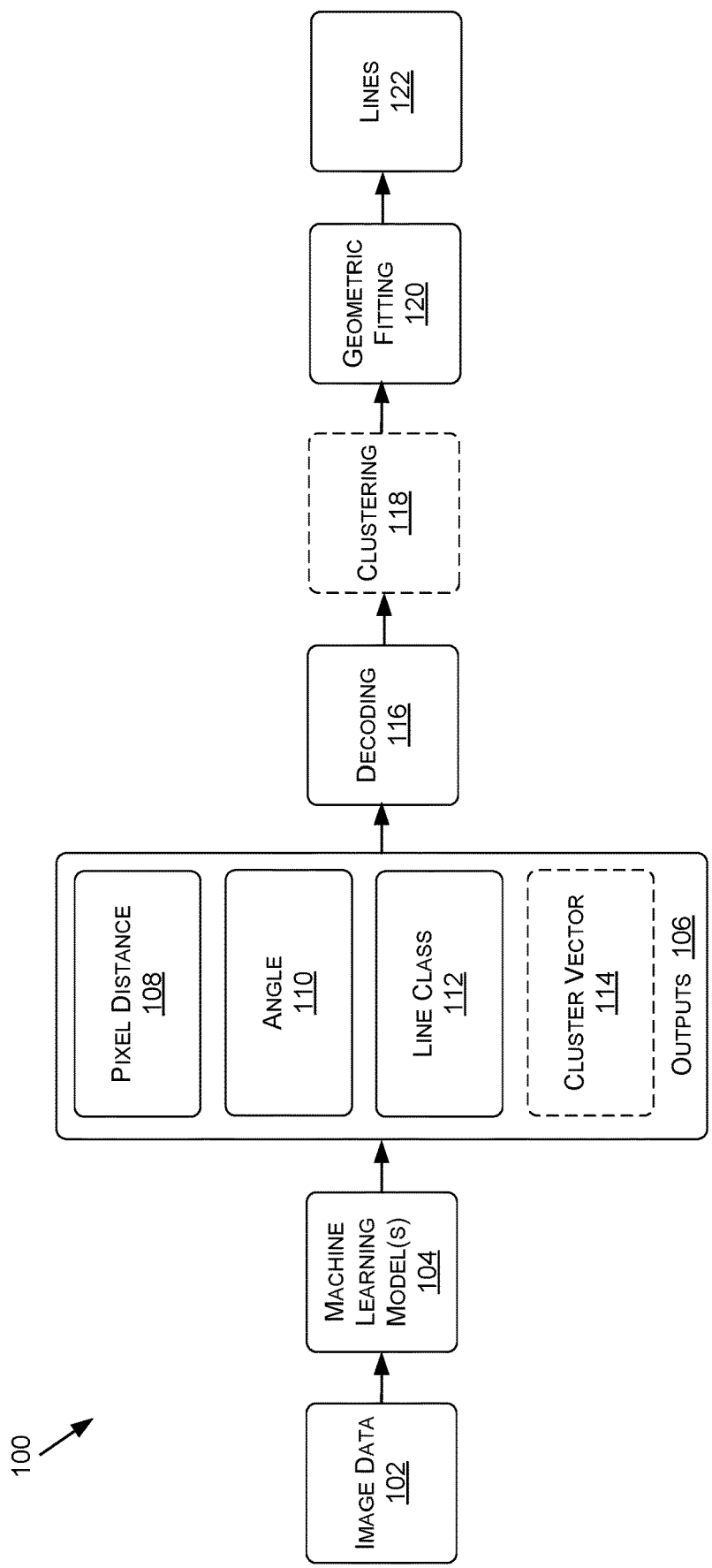
FIG. 1A is a data flow diagram illustrating an example process for line predictions using a machine learning model, in accordance with some embodiments of the present disclosure.

Systems and methods are disclosed related regression-based line detection for autonomous driving machines. Although the present disclosure may be described with respect to an example autonomous vehicle 1000 (alternatively referred to herein as "vehicle 1000" or "autonomous vehicle 1000," an example of which is described herein with respect to FIGS. 10A-10D), this is not intended to be limiting. For example, the systems and methods described herein may be used by non-autonomous vehicles, semi-autonomous vehicles (e.g., in adaptive driver assistance systems (ADAS)), robots, warehouse vehicles, off-road vehicles, flying vessels, boats, a passenger vehicle, a car, a truck, a bus, a first responder vehicle, a shuttle, an electric or motorized bicycle, a motorcycle, a fire truck, a police vehicle, an ambulance, a construction vehicle, an underwater craft, a drone, and/or another type of vehicle (e.g., that is unmanned and/or that accommodates one or more passengers). In addition, although the present disclosure may be described with respect to autonomous driving, this is not intended to be limiting. For example, the systems and methods described herein may be used in robotics, aerial systems, boating systems, and/or other technology areas, such as for perception, world model management, path planning, obstacle avoidance, and/or other processes.

In contrast to conventional systems, such as those described herein, the system of the present disclosure preserves rich spatial information available at an input resolution of a machine learning model (e.g., a deep neural network (DNN), such as a convolutional neural network (CNN)) while maintaining the advantages of lower resolution processing by the machine learning model. As a result, the accuracy of the predictions of lane lines, road boundaries, text, and/or other features of the environment is preserved even as the machine learning model processes the inputs through convolutional operations to generate compressed outputs. For example, the image data used as an input to the machine learning model may be encoded such that the high-resolution information is not lost during the quantization or down-sampling introduced during machine learning model processing. Encoding may be performed on the ground truth data (e.g., annotated labels corresponding to lane lines, road boundaries, text, and/or other features) in a way that creates enough redundancy to preserve the rich spatial information during the processing inherent in machine learning models—especially in CNNs. Some non-limiting benefits of the system and methods of the present disclosure are increased lane detection range, increased lane edge precision or recall, and the ability to preserve rich spatial information available in high-resolution images while leveraging lower-resolution image processing—thereby reducing the computational burden for in-vehicle inferencing. In addition, in some embodiments, both encoding (e.g., during training) and decoding (e.g., during inference, in deployment) may be GPU accelerated, such as by parallelizing algorithms for encoding and/or decoding through several compute kernels (e.g., CUDA kernels of NVIDIA's CUDA) to decrease run-time in deployment and processing times during training.

The machine learning model of the present disclosure may be trained to predict, in deployment, one dimensional (1D) and/or two-dimensional (2D) distances from each pixel to a closest pixel that belongs to a line, angles along the line, and/or line types (e.g., solid, dashed, road boundary, text, sign, etc.). The 1D and/or 2D distances may be computed to preserve the spatial information of the image data at input resolution. For example, because each pixel may be encoded with a pixel distance that corresponds to a distance to a line pixel (e.g., a pixel determined to correspond to a line in the image, or to another feature type the machine learning model is trained to predict), even when pixel information is lost during processing, the pixel distances may be used to recover the location of the original pixel in the high-resolution image that corresponds to the line. As such, the output resolution of the machine learning model may be less than the input resolution, and a decoding process may be used to reconstruct the line information for the input resolution image from the output of the machine learning model. During decoding, a voting method based on encoded pixel data may be used to reconstruct the line formation for the input resolution image. For example, each of the pixel values from the output may be used to cast votes for pixels in the input resolution image and, where a threshold number of votes are cast for a pixel, the pixel may be determined to belong to a line in the input image.

The angles along the lines may be used to reconstruct a shape of the line, where the shape or geometry of the line may be used by an autonomous vehicle for lane keeping, handling in and between lanes, etc. During training, an angle may be calculated and encoded for each pixel corresponding to a line (e.g., using the ground truth line annotations to determine the representative pixels). A 0-360 degree value for the angle may be encoded for each of the pixels, where the angle value is calculated relative to a horizontal line extending along the row of pixels of the pixel for which the angle is being encoded. Instead of encoding the angle itself, in some embodiments, the cosine and sine components of the angle value may be encoded. Pixel-to-pixel variations may be overcome using a smoothing technique. During decoding, the value output by the machine learning model may correspond to the angle for the line at the pixel location.

The machine learning model may be trained to detect line types for use by the autonomous vehicle in determining appropriate behaviors within the environment. As non-limiting examples, whenever a dashed line is detected, a vehicle may be able to perform lane changes or passing maneuvers. Likewise, when a solid yellow line is detected, the autonomous control system of vehicle may understand that any maneuver may not cross over the solid yellow line. For different line classes, a different value may be assigned. However, in contrast to conventional systems that may require an output to represent each of N different line classes, the current system may encode a bit value for each different line class. By encoding a bit value, the machine learning model may only need to output $\log_2(N)$ outputs as opposed to an output for each of the N different line classes. The machine learning model may thus output a binary sequence corresponding to a number of bits that the machine learning model is trained to predict (e.g., four bit binary sequence generates four output channels, one for each bit). As a result, the machine learning model training may be quickly scalable to additional classes without requiring the machine learning model to be trained to predict an additional output channel for each class.

In some embodiments, to determine which line pixels correspond to a same line, a high-dimensional embedding algorithm may be used by the machine learning model to predict clusters—or to connect the dots—for inferring the full geometry of the line. For example, each line pixel may be mapped to a high-dimensional vector in a way that separates, in space, the high-dimensional vector from other high-dimensional vectors that are not of the same line. This process may be completed for each of the line pixels of the image. The machine learning model may then use the relationship (or proximity) of the high-dimensional vectors to determine clusters, or connectivity, between the line pixels. Pixels that have associated vectors within a first threshold distance ($2 \times d_{within}$)—where $d_{within}$ corresponds to a within-cluster variance—may be clustered together, and pixels that have associated vectors greater than a second threshold distance apart (e.g., $4 \times d_{within}$) may be determined to be of different clusters. For example, a first vector may be registered as a first cluster (e.g., corresponding to a first line in an image). A second vector may be used to calculate a Euclidean distance between the first vector and the second vector. If the distance is less than the first threshold, the first vector and the second vector may be assigned to the first cluster, and if the distance is greater than the second threshold, the second vector may be registered as a second cluster. In some embodiments, mean-shift clustering may be executed using a kernel radius of $d_{within}$.

During decoding, since each line pixel may be mapped to a pixel coordinate location in the input image, and the line pixels may be mapped to high-dimensional vectors, inverse mapping may be used to determine the line pixels that correspond to the clusters of high-dimensional vectors. To generate a geometric fit of the resulting line in the image, a least squares polyfit process may be executed to produce polynomial coefficients that represent a full line. In some non-limiting examples, third order polyfit (e.g., four coefficients) may be used.

Line Predictions Using a Machine Learning Model

Now referring to FIG. 1A, FIG. 1A is a data flow diagram illustrating an example process 100 for line predictions using a machine learning model, in accordance with some embodiments of the present disclosure. At a high level, the process 100 may include one or more machine learning models 104 receiving one or more inputs, such as image data 102, and generating one or more outputs, such as pixel distances 108, angles 110, line classes 112, and/or cluster vectors 114. The image data 102 may be generated by one or more cameras of an autonomous vehicle (e.g., vehicle 1000, as described herein at least with respect to FIGS. 10A-10D). In some embodiments, the image data 102 may additionally or alternatively include other types of sensor data, such as LIDAR data from one or more LIDAR sensors 1064, RADAR data from one or more RADAR sensors 1060, audio data from one or more microphones 1096, etc. The machine learning model(s) 104 may be trained to generate the outputs 106 that may be used by perception component(s), world model management component(s), planning component(s), control component(s), and/or other components of an autonomous driving software stack. For example, with respect to the vehicle 1000, lines 122 may be used to inform controller(s) 1136, ADAS system 1138, SOC(s) 1104, and/or other components of the autonomous vehicle 1000 of the environment, to aid the autonomous vehicle 1000 in performing one or more operations (e.g., path planning, mapping, etc.) within the environment.

In some embodiments, the image data 102 may include data representative of images of a field of view of one or more cameras of a vehicle, such as stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, and/or other camera type of the autonomous vehicle 1000 (FIGS. 10A-10D). In some examples, the image data 102 may be captured by a single camera with a forward-facing, substantially centered field of view with respect to a horizontal axis (e.g., left to right) of the vehicle 1000. In a non-limiting embodiment, one or more forward-facing cameras may be used (e.g., a center or near-center mounted camera(s)), such as a wide-view camera 1070, a surround camera 1074, a stereo camera 1068, and/or a long-range or mid-range camera 1098. The image data captured from this perspective may be useful for perception when navigating—e.g., within a lane, through a lane change, through a turn, through an intersection, etc.—because a forward-facing camera may include a field of view (e.g., the field of view of the forward-facing stereo camera 1068 and/or the wide-view camera 1070 of FIG. 10B) that includes both a current lane of travel of the vehicle 1000, adjacent lane(s) of travel of the vehicle 1000, and/or boundaries of the driving surface. In some examples, more than one camera or other sensor (e.g., LIDAR sensor, RADAR sensor, etc.) may be used to incorporate multiple fields of view or sensory fields (e.g., the fields of view of the long-range cameras 1098, the forward-facing stereo camera 1068, and/or the forward-facing wide-view camera 1070 of FIG.

In some examples, the image data 102 may be captured in one format (e.g., RCCB, RCCC, RBGC, etc.), and then converted (e.g., during pre-processing of the image data) to another format. In some other examples, the image data 102 may be provided as input to an image data pre-processor (not shown) to generate pre-processed image data. Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format (e.g., H.264/Advanced Video Coding (AVC), H.265/High Efficiency Video Coding (HEVC), VP8, VP9, Alliance for Open Media Video 1 (AV1), Versatile Video Coding (VVC), or any other video compression standard), raw images such as originating from Red Clear Blue (RCCB), Red Clear (RCCC) or other type of imaging sensor. In some examples, different formats and/or resolutions could be used for training the machine learning model(s) 104 than for inferencing (e.g., during deployment of the machine learning model(s) 104 in the autonomous vehicle 1000).

An image data pre-processor may use image data representative of one or more images (or other data representations, such as LIDAR depth maps) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the image data pre-processor. This ordering may be chosen to maximize training and/or inference performance of the machine learning model(s) 104.

In some embodiments, a pre-processing image pipeline may be employed by the image data pre-processor to process a raw image(s) acquired by a sensor(s) (e.g., camera(s)) and included in the image data 102 to produce pre-processed image data which may represent an input image(s) to the input layer(s) (e.g., feature extractor layer(s) 142 of FIG. 1C) of the machine learning model(s) 104. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the image data pre-processor, it may include bilateral denoising in the Bayer domain. Where demosaicing is employed by the image data pre-processor, it may include bilinear interpolation. Where histogram computing is employed by the image data pre-processor, it may involve computing a histogram for the C channel, and may be merged with the decompanding or noise reduction in some examples. Where adaptive global tone mapping is employed by the image data pre-processor, it may include performing an adaptive gamma-log transform. This may include calculating a histogram, getting a mid-tone level, and/or estimating a maximum luminance with the mid-tone level.

The machine learning model(s) 104 may use one or more images or other data representations (e.g., LIDAR data, RADAR data, etc.) as represented by the image data 102 as input to generate the output(s) 106. In a non-limiting example, the machine learning model(s) 104 may take one or more of: an image(s) represented by the image data 102 (e.g., after pre-processing) to generate the pixel distances 108, the angles 110, the line classes 112, and/or the cluster vectors 114 as input. Although examples are described herein with respect to using neural networks and specifically CNNs as the machine learning model(s) 104, this is not intended to be limiting. For example and without limitation, the machine learning model(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The outputs of the machine learning model(s) 104 may include the pixel distances 108, the angles 110, the line classes 112, the cluster vectors 114, and/or other output types. In order to decode the outputs of the machine learning model(s) 104, in some non-limiting examples, GPU acceleration may be implemented. For example, a parallel processing platform (e.g., NVIDIA's CUDA) may be implemented to parallelize algorithms through several compute kernels for decoding the outputs—thereby decreasing runtime.

Figure 2A:
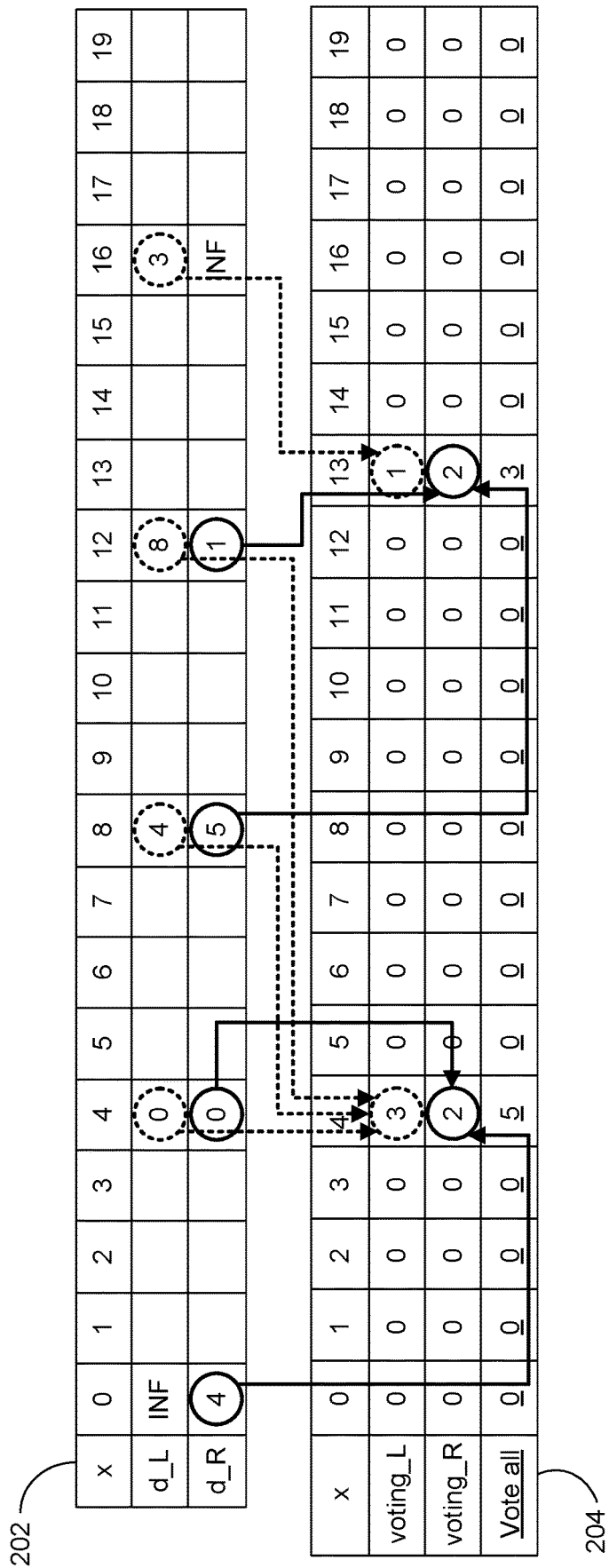
FIGS. 2A-2B are example illustrations of voting methods for decoding line predictions, in accordance with some embodiments of the present disclosure.
Figure 2B:
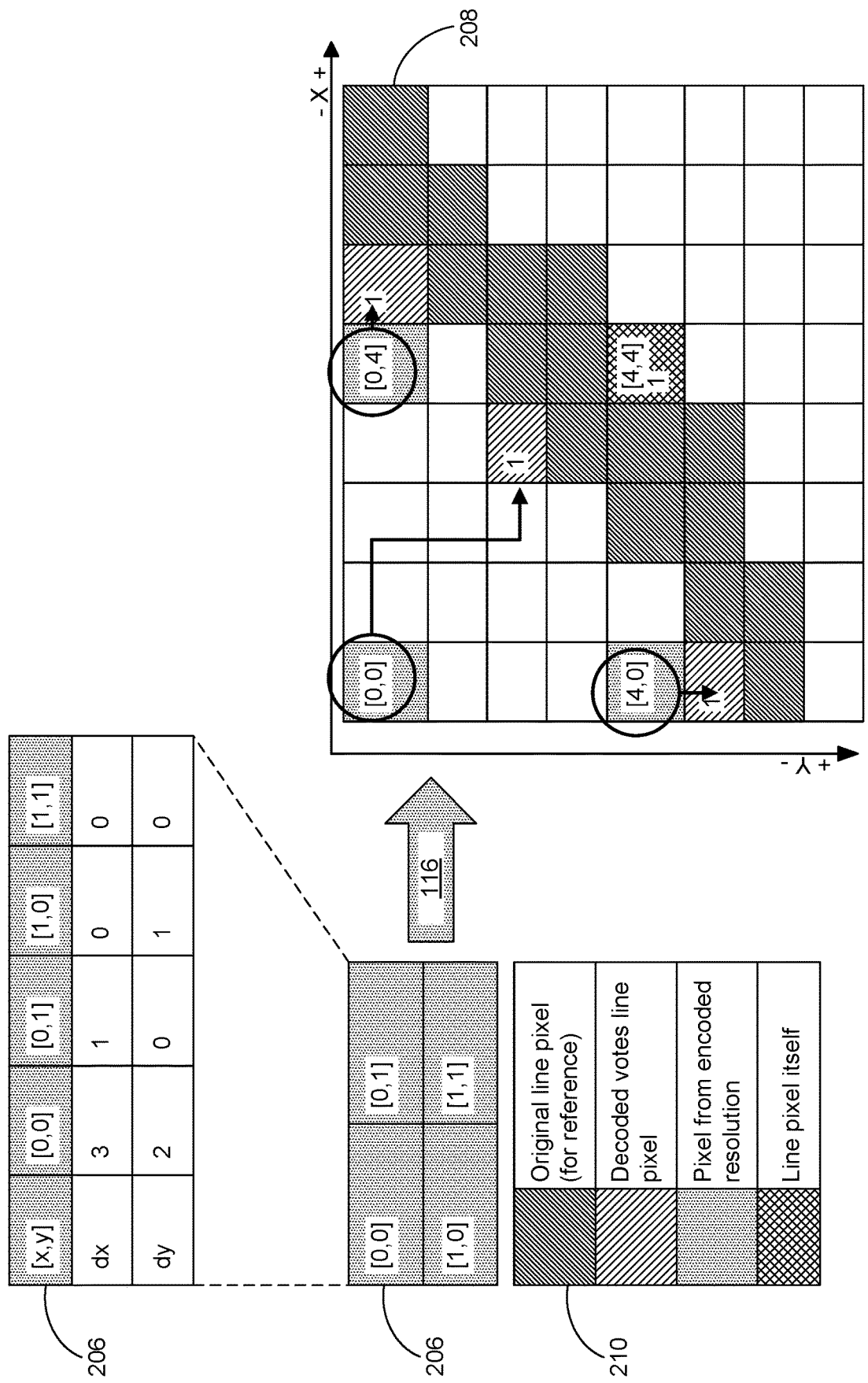

The pixel distances 108 may include, for each pixel in an image, a distance in image space to a nearest pixel that is incorporated a line (e.g., a line pixel) as depicted in the image. The pixel distances 108 may include distances in a single dimension (1D) and/or distances in two dimensions (2D). For example, for 1D distances, the pixel distances 108 may include a distance along a row of pixels to a nearest line pixel in a right direction (d_R) and/or a nearest line pixel in a left direction (d_L) (e.g., as illustrated in FIG. 2A). As such, the machine learning model(s) 104 may compute, for each pixel at the output resolution, an output of a distance to a nearest line pixel to the left along the row of pixels and to the right along the row of pixels. As another example, for 2D distances, the pixel distances 108 may include a distance to a nearest line pixel along a row of pixels of the image (d_X) and along a column of line pixels of the image (d_Y) (e.g., as illustrated in FIG. 2B). As such, the machine learning model(s) 104 may compute, for each pixel at the output resolution, an output of a distance to a nearest line pixel along a column of pixels and a distance along a row of pixels, where the distance along the column and the row may be used to determine a magnitude of distance between the pixel and the line pixel.

As a result of the processing of the machine learning model(s) 104, the pixel distances 108 computed by the machine learning model(s) 104 may correspond to the lower spatial resolution output than the spatial resolution of the input image. However, as described herein, an advantage of the present disclosure is the preservation of the spatial information from the higher input resolution of the machine learning model(s) 104 using the pixel distances 108. For example, the pixel locations from the output of the machine learning model(s) 104 may be converted to a pixel location at the input resolution during decoding 116. As a non-limiting example, where the output corresponds to a lower relative spatial resolution by a factor of four (e.g., the output corresponds to a resolution that is a quarter of the input resolution), each [y, x] pixel location at the output may be multiplied by four (e.g., [1, 1] at the output may become [4, 4] at the resolution corresponding to the input image). As such, the pixel distances 108 corresponding to the pixel location at the output may be determined to correspond to the pixel location at the resolution of the input—thereby preserving the spatial information from the input resolution.

As an example of 1D decoding, FIG. 2A includes an example illustration of a voting method for decoding line predictions, in accordance with some embodiments of the present disclosure. During decoding 116 in a 1D example, the predictions of the pixel distances 108 output by the machine learning model(s) 104 may first be converted back to the pixel locations at the input resolution. For example, table 202 may represent the pixel distances 108 along a row of pixels at the input resolution. As such, because the output may correspond to a resolution that is smaller (e.g., by a factor of four) in the example of FIG. 2A, the pixel distances 108 may only be output by the machine learning model(s) 104 for every fourth pixel in the row of pixels (e.g., at 0, 4, 8, 12, 16, etc.) with respect to the input resolution. As such, once the pixel distances 108 to the nearest line pixel to the right (d_R) and to the left (d_L) along the row of pixels have been associated with the proper pixel locations at the input resolution, a voting method may be executed as part of the decoding 116. For example, each pixel distance 108 may cast a vote for a location of a line pixel, as illustrated in table 204. The voting may be a combination of left votes (voting_L) and right votes (voting_R), such that a final vote value (vote all) may be computed. As an example, with respect to the left votes, the pixel distance 108 of 0 at pixel 4 in the row from table 202 may cast a vote for pixel 4 at the output resolution of table 204, the pixel distance 108 of 4 at pixel 8 in the row from table 202 may cast another vote for pixel 4 at the output resolution 204, and so on. Similarly, for right votes, the pixel distance 108 of 4 at pixel 0 in the row from table 202 may cast a vote for pixel 4 at the output resolution of table 204, the pixel distance 108 of 5 at pixel 8 in the row from table 202 may cast a vote for pixel 13 at the output resolution of table 204, and so on. The left votes and the right votes for each pixel in the row of table 204 may then be tallied, or added, to determine the final vote value. In some examples, once a threshold number of votes are computed for a pixel at the output resolution, the pixel may be determined to be a line pixel. The threshold number, in some non-limiting examples, may be 1, 2, 4, 6, or another threshold value.

The process of decoding 116 the pixel distances 108 may be repeated for each row of pixels in the image. As such, each of the line pixels in the image at the input resolution may be determined using the voting method of FIG. 2A. Although the example of FIG. 2A includes down-sampling by a factor of four, this is not intended to be limiting. In some examples, the machine learning model(s) 104 may not produce output corresponding to lower resolutions than the input resolution, or may produce output corresponding to resolutions that are lower than the input resolution by a factor of two, four, five, six, and/or another factor without departing from the scope of the present disclosure. In addition, although the tables 202 and 204 of FIG. 2A include only 20 pixel locations (e.g., 0-19) along a row of pixels at the input resolution, this is for example purposes only. As such, the number of pixels may correspond to any input resolution width, such as 2048, 1920, 560, and/or any other input resolution width. Further, although the examples herein for 1D pixel distances are described with respect to a row of pixels, this is not intended to be limiting. In some examples, in addition to or alternatively from a row of pixels, a column of pixels may be used for determining the 1D pixel distances, and/or encoding may be performed in the up and down directions instead of the left and right directions for at least one pixel.

As an example of 2D decoding, FIG. 2B includes an example illustration of a voting method for decoding line predictions, in accordance with some embodiments of the present disclosure. Table 206 may represent an output of the machine learning model(s) 104 with respect to pixel distances 108 for 2D predictions. For example, similar to above, the machine learning model(s) 104 may output predictions corresponding to a lower resolution image space than the input resolution (e.g., the encoded resolution) by a factor of four. As such, the pixel locations at the output resolution (e.g., as represented in the table 206) may be converted to pixel locations at the input resolution during decoding 116 (e.g., as represented in table 208). The pixel distances 108 in the x (dx) and y (dy) directions may be used to cast votes for pixels at the input resolution. In some examples, the pixel distances 108 may further include a negative x direction (−dx) and a negative y direction (−dy). As such, where the nearest line pixel is along the x axis (e.g., width of image) or y axis (e.g., height of image) in a negative direction, the values for the pixel distances 108 may correspond to the −dx and/or −dy outputs. For example, a pixel location [0, 1] from the table 206 at the output resolution may be converted to a pixel location of (0, 4) at the input resolution during decoding 116. As such, in the table 208, the pixel distances of dx=0 and dy=1 may be used to cast a vote for pixel [0, 5] as being a line pixel. Similarly, a pixel location [1, 1] from the table 206 at the output resolution may be converted to a pixel location of (4, 4) at the input resolution during decoding 116. As such, in the table 208, the pixel distances of dx=0 and dy=0 may be used to cast a vote for pixel [4, 4] as being a line pixel (e.g., a line pixel itself, from key 210). Similar to the 1D approach described herein, once a threshold number of votes have been cast for a pixel, the pixel may be determined to be a line pixel. Assuming as a non-limiting example the threshold number of votes is one, the pixels [2, 3], [0, 5], [5, 0], and [4, 4] may each receive one vote (based on the table 206), and thus may be determined to be line pixels.

Using a 2D approach may allow for capturing of arbitrary orientations of a lane edge (e.g., horizontal, vertical, arbitrarily angled, etc.), as well as arbitrary lane marking shapes. In some examples, the pixel distances 108 may be represented in Euclidean coordinates, while in others examples, polar coordinates may be used. In addition, in some 1D and/or 2D embodiments, votes for pixels may be weighted differently. For example, self-votes for a line pixel may be weighted more than votes from other pixels.

Figure 2C:
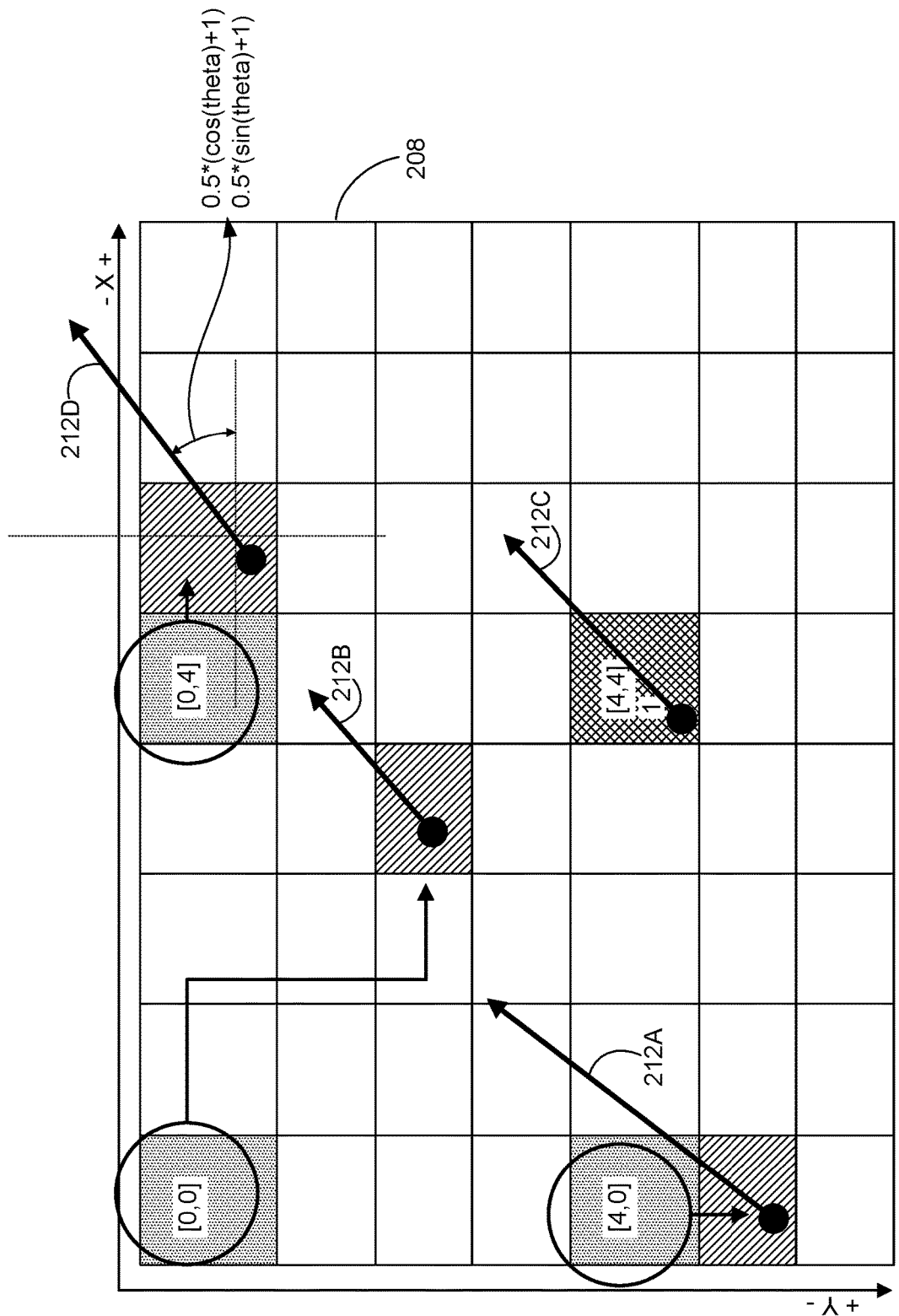
FIG. 2C is an example illustration of a method for decoding line angles, in accordance with some embodiments of the present disclosure.

Another output 106 of the machine learning model(s) 104 may be the angles 110. The angles 110 may represent the angles of the line at the line pixel (e.g., angles 212 of the line pixels of the table 208 of FIG. 2C). In some embodiments, the machine learning model(s) 104 may output an angle value (e.g., from 0-360 degrees). In such embodiments, decoding 116 the angles 110 may include reading out the binary value of the angle at the output of the machine learning model(s) 104. In some examples, rather than reading out a value of the angles 110, cosine and sine components of a 360 degree angle may be determined from the output of the machine learning model(s) 104 (e.g., as illustrated for angle 212D of FIG. 2C). The cosine and sine components may then be used to determine the angle value at the line pixel. Each pixel at the output resolution may include the angle 110 for the line pixel that it casts a vote for. For example, the pixel at [0, 4] may provide at least one vote or value for the angle 212D for the pixel at [0, 5]. As another example, the pixel at [4, 4] may provide at least one vote for value for the angle 212C at the pixel [4, 4] because [4, 4] is a line pixel itself. In some examples, the values of the angles may be different across two or more votes. In such examples, averaging may be used to find an average angle, and/or weighting may be used such that some of the pixels angle values have a greater weight (e.g., line pixels themselves may be weighted more heavily than angles from other pixels).

In some examples, the angles 110 may further include a tangent value for the line at the location of the line pixel. In such examples, the machine learning model(s) 104 may be trained to output a tangent value for the line at each line pixel, such that a more accurate representation of the geometry of the line may be determined. In addition, by using the tangent, determining which line pixels belong to the same line may be more effective (e.g., if a first line pixel has a tangent value that represents the line is in a forward and left orientation, and a second line pixel adjacent to—or within a threshold distance to the first line pixel—has a tangent value that represents the line is in a backward and left orientation, the first line pixel and the second line pixel likely are not of the same line).

The machine learning model(s) 104 may further output the line class 112. The line class 112 may correspond to a lane line, such as dashed, solid, yellow, white, or a boundary line, such as a line on a boundary of a highway or street. In some examples, the line class 112 may include a pole, a letter, a road marking type (e.g., a turn arrow, a stop indication, etc.), a crosswalk, etc. In other examples, such as where the machine learning model(s) 104 is not used in a vehicle or driving application, any types of lines may be included in the line classes 112 predicted by the machine learning model(s) 104. As described in more detail herein, the line class 112 may be output by the machine learning model(s) 104 as a bit value, such that the machine learning model(s) 104 does not need to generate an output (e.g., a confidence) for each class type the model 104 is trained to predict. As a result, where conventional approaches may output N predictions for N classes, the machine learning model(s) 104 may output $\log_2(N)$ predictions, which is much more efficient and requires less compute resources. Although the machine learning model(s) 104 may output the line classes 112 as bit values, this is not intended to be limiting, and in other examples the machine learning model(s) 104 output a confidence or prediction for each class type (e.g., where bit encoding is not used to train the machine learning model(s) 104). In any example, the line class 112 may be determined by using the value of the output of the machine learning model(s) 104 and determining the line class 112 associated with the value (e.g., if a solid yellow line is the line class 112, and is associated with a value of 3, when the machine learning model(s) 104 outputs [0 0 1 1]

as a bit value that equals 3, the system may know that the line class 112 is a solid yellow line).

In some optional embodiments (as indicated by the dashed lines in FIGS. 1A and 5), the cluster vectors 114 (or clusters of the cluster vectors 114) may be output by the machine learning model(s) 104. For example, the machine learning model(s) 104 may be trained (as described in more detail herein) to predict high-dimensional vectors—or values thereof—for each pixel, or line pixel, such that line pixels associated with similar high-dimensional vectors (or cluster vectors 114) may be determined to correspond to a same line in the image. For example, values of $d_{between}$ and $d_{within}$, as described in more detail herein, may be used to determine when line pixels correspond to a same line in the image. The process of taking the clusters of the cluster vectors 114 that are output by the machine learning model(s) 104 and determining the line pixels that correspond to the same line may be referred to herein as clustering 118 (e.g., an optional process, as indicated by the dashed lines in FIG. 1A). For example, because each pixel at location ($x_i$, $y_i$) may be mapped to a high dimensional vector, H ($x_i$, $y_i$), inverse mapping may be performed to go from the clustered sets of cluster vectors 114 output by the machine learning model(s) 104 to image pixels of an image represented by the image data 102. As such, pixels that map to vectors of a single vector cluster in the high dimensional space may map to a single line in image space.

Geometric fitting 120 may be executed on the output of the clustering 118 (e.g., once the line pixels have been determined to correspond to a same line). The geometric fitting 120 may include a least squares polyfit approach which may produce polynomial coefficients that represent the full line. For example, third order polyfit (e.g., four coefficients) may be used to perform the geometric fitting 120. However, this is not intended to be limiting, and other geometric method variations may be used without departing from the scope of the present disclosure.

Figure 3:
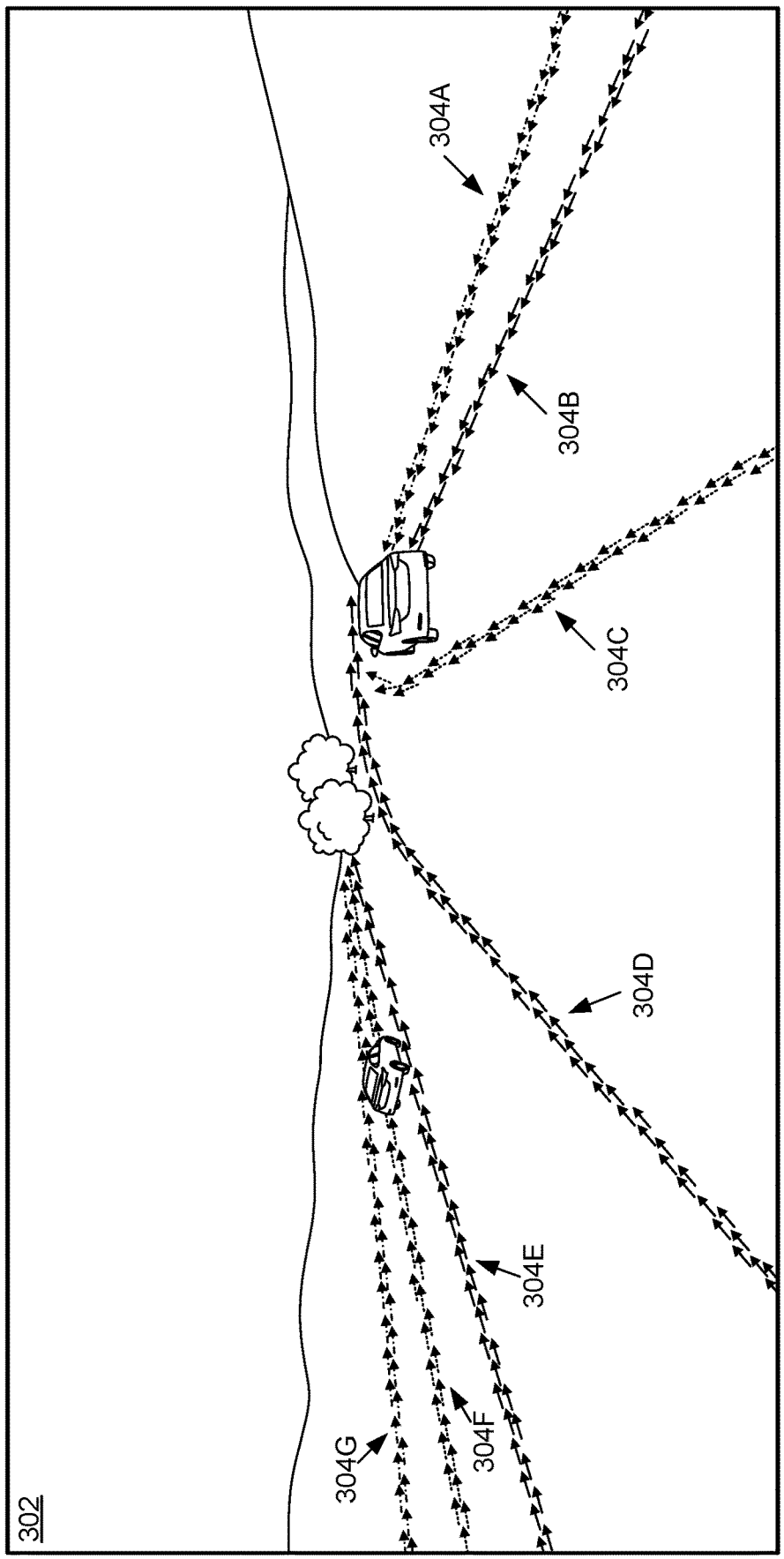
FIG. 3 is an example visualization of recreating lines for an image using predictions of a machine learning model, in accordance with some embodiments of the present disclosure.

As such, in some example, the pixel distances 108 may be used to determine the location of the line pixels in the image, the angles 110 (and/or tangents) may be used to determine an orientation or geometry of the line corresponding to each of the line pixels, the line classes 112 may be used to determine what type of line the line is, and/or the cluster vectors 114 may be used to determine the line pixels that correspond to a same line 122. This information may be used to determine a layout and identification of the lines 122 in a field(s) of view of one or more cameras (e.g., of an autonomous machine, such as the vehicle 1000, a camera at a baggage carousel, a camera in a shopping center, etc.). For example, with reference to FIG. 3, FIG. 3 is an example visualization 302 of recreating lines 122 for an image using predictions of a machine learning model, in accordance with some embodiments of the present disclosure. The visualization 302 may include lines 304 (e.g., lines 304A-304G, and so on) of a road (e.g., lane lines, boundary lines, etc.), where pixels are represented in the visualization 302 with their vectors or geometry to provide an illustration of the location and direction of lines in the image as determined from the output of the machine learning model(s) 104. For example, each arrow may represent a predicted line angle drawn as a unit vector. In addition, the lines 304 are illustrated with different arrow types to indicate the line classes 112 (e.g., the line 304A includes dashed arrows, the line 304B includes solid line arrows, etc.). Although not visually represented, the determination of which of the arrows belong to each of the lines 304 may be made using the cluster vectors 114 and/or the tangent values.

Figure 1B:
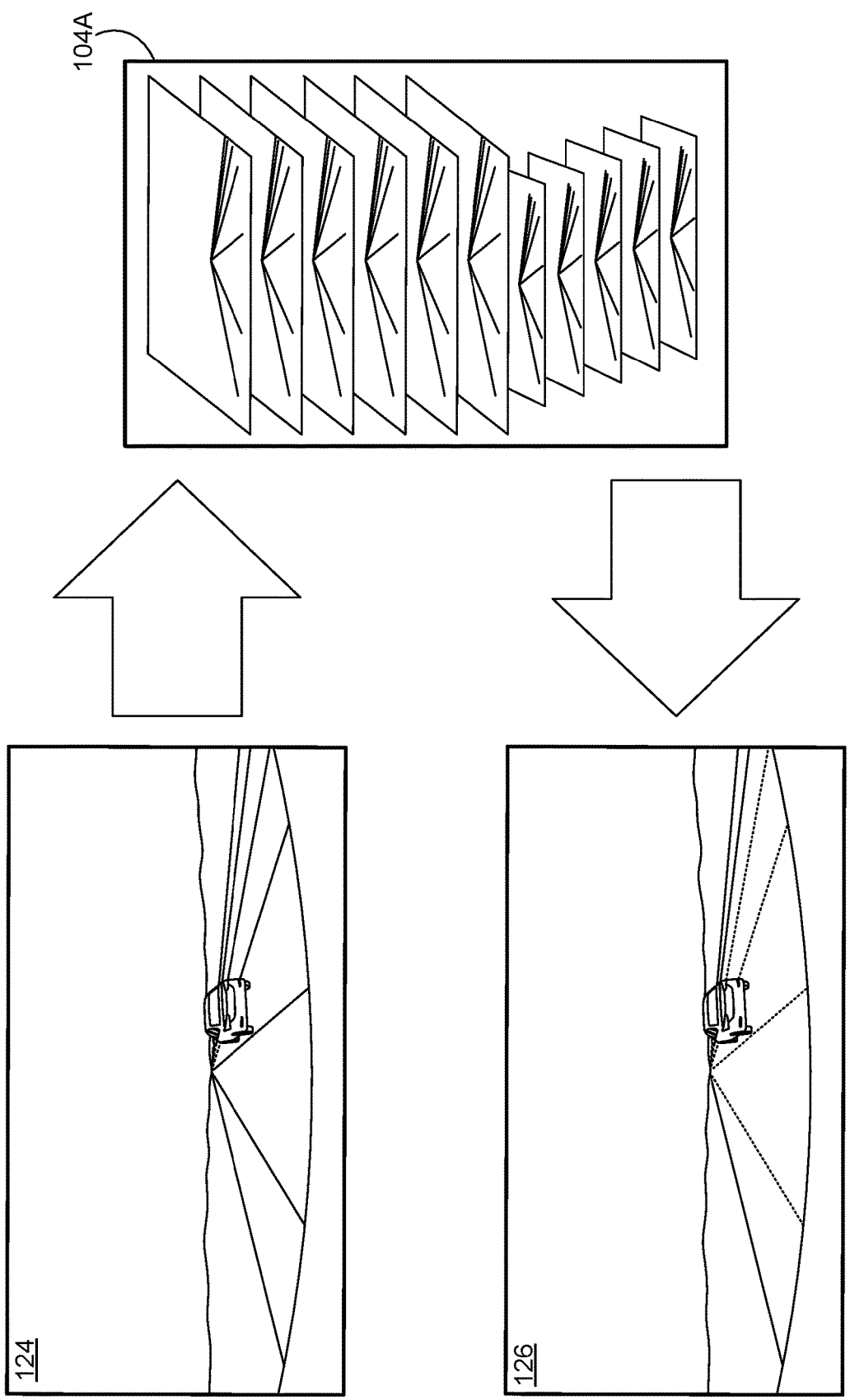
FIG. 1B is an example illustration of using a machine learning model to recreate lines for an image, in accordance with some embodiments of the present disclosure.

Now referring to FIG. 1B, FIG. 1B is an example illustration of using a machine learning model to recreate lines for an image, in accordance with some embodiments of the present disclosure. The machine learning model(s) 104A of FIG. 1B may be one example of a machine learning model(s) 104 that may be used in the process 100. However, the machine learning model(s) 104A of FIG. 1B is not intended to be limiting, and the machine learning model(s) 104 may include additional and/or different machine learning models than the machine learning model(s) 104A of FIG. 1B. The machine learning model(s) 104A may include or be referred to as a convolutional neural network (CNN) and thus may alternatively be referred to herein as convolutional neural network 104A, convolutional network 104A, or CNN 104A.

The CNN 104A may use the image data 102 (and/or other sensor data types) (with or without any pre-processing) as an input. For example, the CNN 104A may use the image data 102—as represented by image 124—as an input. The image data 102 may represent images generated by one or more cameras (e.g., one or more of the cameras described herein with respect to FIGS. 10A-10C). For example, the image data 102 may be representative of a field of view of the camera(s). More specifically, the image data 102 may be representative of individual images generated by the camera(s), and the image data 102 representative of one or more of the individual images may be input into the CNN 104A at each iteration of the CNN 104A. In addition to the image data 102, in some embodiments, sensor data may be input to the CNN 104A in addition to or alternatively from, the image data 102. The sensor data may be representative of perspectives of a physical environment (e.g., sensory fields) as observed by one or more sensors—such as a LIDAR sensor(s), a RADAR sensor(s), a microphone(s), a SONAR sensor(s), etc.

One or more of the layers of the CNN 104A may include an input layer. The input layer(s) may hold values associated with the image data 102, and/or the sensor data. For example, with respect to the image data 102, the input layer(s) may hold values representative of the raw pixel values of the image(s) as a volume (e.g., a width, W, a height, H, and color channels, C (e.g., RGB), such as 32×32×3), and/or a batch size, B.

One or more layers may include convolutional layers. The image data 102 (and/or the sensor data) may be input into a convolutional layer(s) of the CNN 104A (e.g., after one or more input layers and/or other layer types). The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the CNN 104A may not include any pooling layers. In such examples, strided convolution layers may be used in place of pooling layers.

One or more of the layers may include a fully connected layer. Each neuron in the fully connected layer(s) may be connected to each of the neurons in the previous volume. The fully connected layer may compute class scores, and the resulting volume may be 1×1×number of classes.

Although input layers, convolutional layers, pooling layers, ReLU layers, and fully connected layers are discussed herein with respect to the CNN 104A, this is not intended to be limiting. For example, additional or alternative layers may be used, such as normalization layers, SoftMax layers, and/or other layer types.

Different orders and numbers of the layers of the CNN 104A may be used depending on the embodiment. As such, the order and number of layers of the CNN 104A is not limited to any one architecture. In addition, some of the layers may include parameters (e.g., weights and/or biases), such as the layers of the convolutional streams and/or the output layer(s), while others may not, such as the ReLU layers and pooling layers, for example. In some examples, the parameters may be learned during training (e.g., within process 500 of FIG. 5). Further, some of the layers may include additional hyper-parameters (e.g., learning rate, stride, epochs, kernel size, number of filters, type of pooling for pooling layers, etc.), such as the convolutional layers, the output layer(s), and the pooling layers, while other layers may not, such as the ReLU layers. Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment.

The outputs 108 of the CNN 104A may undergo decoding 116, (optional) clustering 118, and/or geometric fitting 120 to generate the lines 122 that may be represented in visualization 126. The lines 122 may represent the lane lines and/or road boundaries from the image 124. The lines 122, and the corresponding information (e.g., the line classes 112, the angles 110, etc.), may be used by one or more layers of an autonomous driving software stack (e.g., a perception layer, a world model manager, a planning layer, a control layer, etc.) to aid in controlling or determining controls for the vehicle 1000 through a physical environment (e.g., through the driving surface of the image 124).

Figure 4:
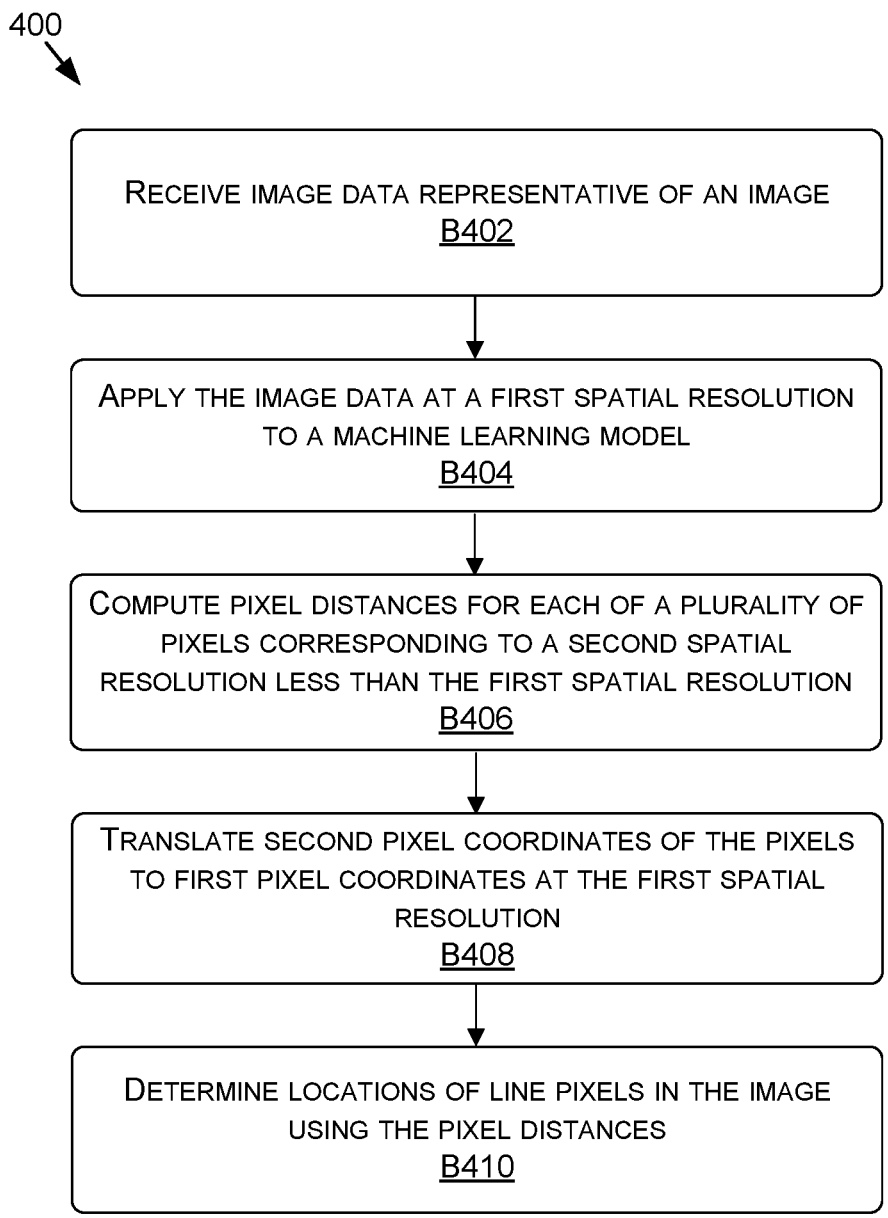
FIG. 4 is a flow diagram showing a method for predicting lines in an image using a machine learning model, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the process 100 of FIG. 1. However, the method 400 may additionally or alternatively be executed by any one system, or any combination of systems, including, but not limited to, those described herein.

FIG. 4 is a flow diagram showing a method for predicting lines in an image using a machine learning model, in accordance with some embodiments of the present disclosure. The method 400, at block B402, includes receiving image data representative of an image. For example, the image data 102 may be received that is representative of an image captured by an image sensor. In some example, sensor data may be captured and/or received in addition, or alternatively to, the image data 102.

The method 400, at block B404, includes applying the image data at a first spatial resolution to a machine learning model. For example, the image data 102 may be applied to the machine learning model(s) 104 at a first spatial resolution.

The method 400, at block B406, includes computing pixel distances for each of a plurality of pixels corresponding to a second spatial resolution less than the first spatial resolution. For example, the pixel distances 108 may be computed, by the machine learning model(s) 104, for each pixel corresponding to the second spatial resolution (e.g., as a result of the machine learning model(s) 104 having been trained to output lower resolution predictions using higher resolution inputs). The pixel distances 108 may represent distances between pixels at the first spatial resolution and nearest line pixels at the first spatial resolution that correspond to a line in the image. As a result, even though the pixel distances 108 are output to correspond to the second spatial resolution, the values of the pixel distances 108 correspond to values at the first spatial resolution such that the spatial information is preserved through processing by the machine learning model(s) 104.

The method 400, at block B408, includes translating second pixel coordinates of the pixels to first pixel coordinates at the first spatial resolution. For example, the coordinates of the pixels at the output resolution may be converted back to their coordinates at the input resolution.

The method 400, at block b410, includes determining locations of line pixels in the image using the pixel distances. For example, locations of line pixels of the lines 122 in the image may be determined using the pixel distances at the coordinates of the input resolution.

Training a Machine Learning Model to Predict Lines in an Image

Figure 5:
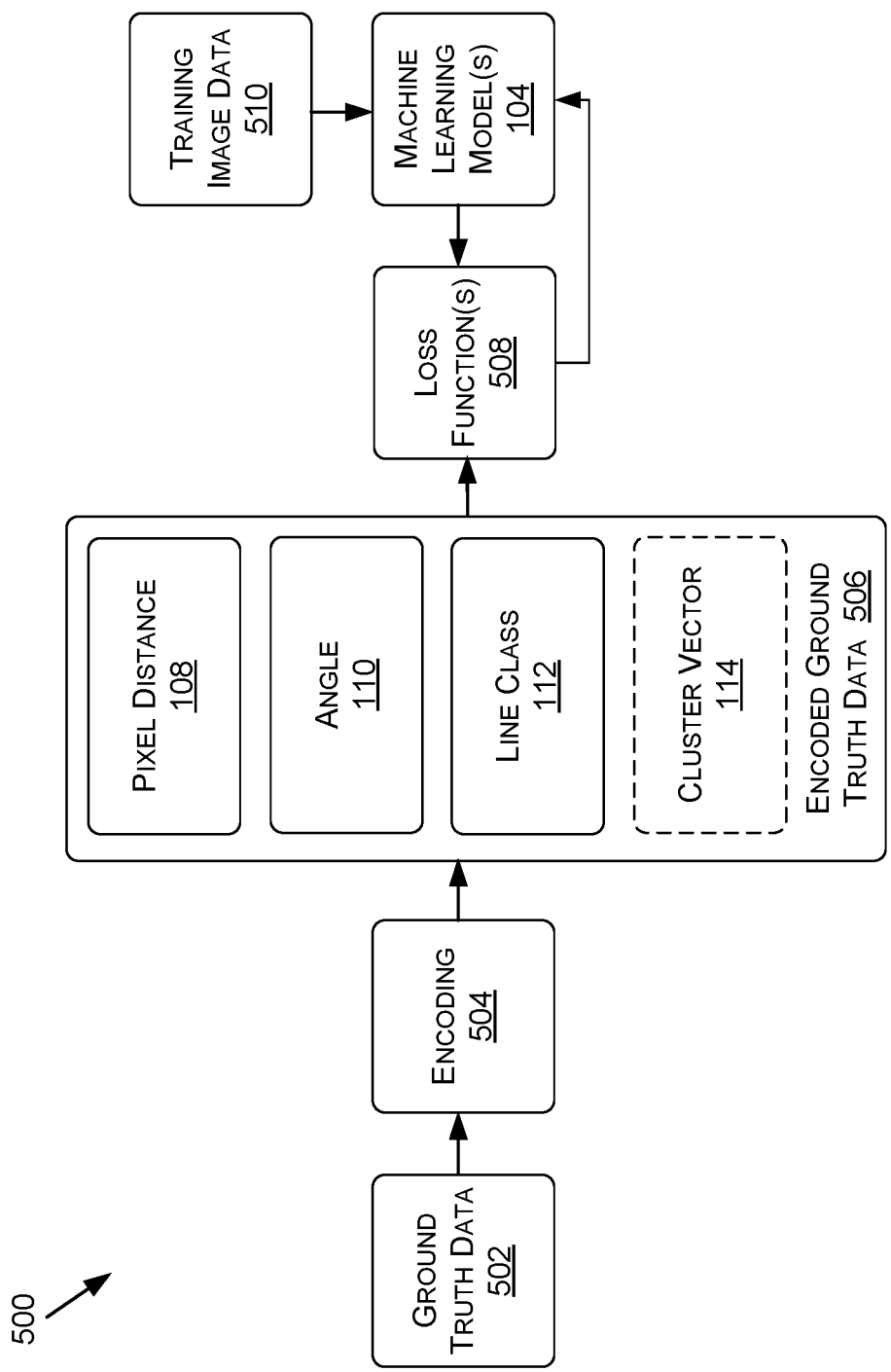
FIG. 5 is data flow diagram illustrating an example process for training a machine learning model for line predictions, in accordance with some embodiments of the present disclosure.

Now referring to FIG. 5, FIG. 5 is data flow diagram illustrating an example process 500 for training a machine learning model for line predictions, in accordance with some embodiments of the present disclosure. Ground truth data 502 may include annotation data, such as labels. The ground truth data 502 may be generate by manual labeling and/or automatic labeling. For example, the labels or other annotation data used for the ground truth data 502 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., polyline points annotated by human, and rasterizer generates full polygons from the polyline points). In some examples, for each input image, or for each input sensor data representation, there may be corresponding labels or annotations as the ground truth data 502.

Figure 6:
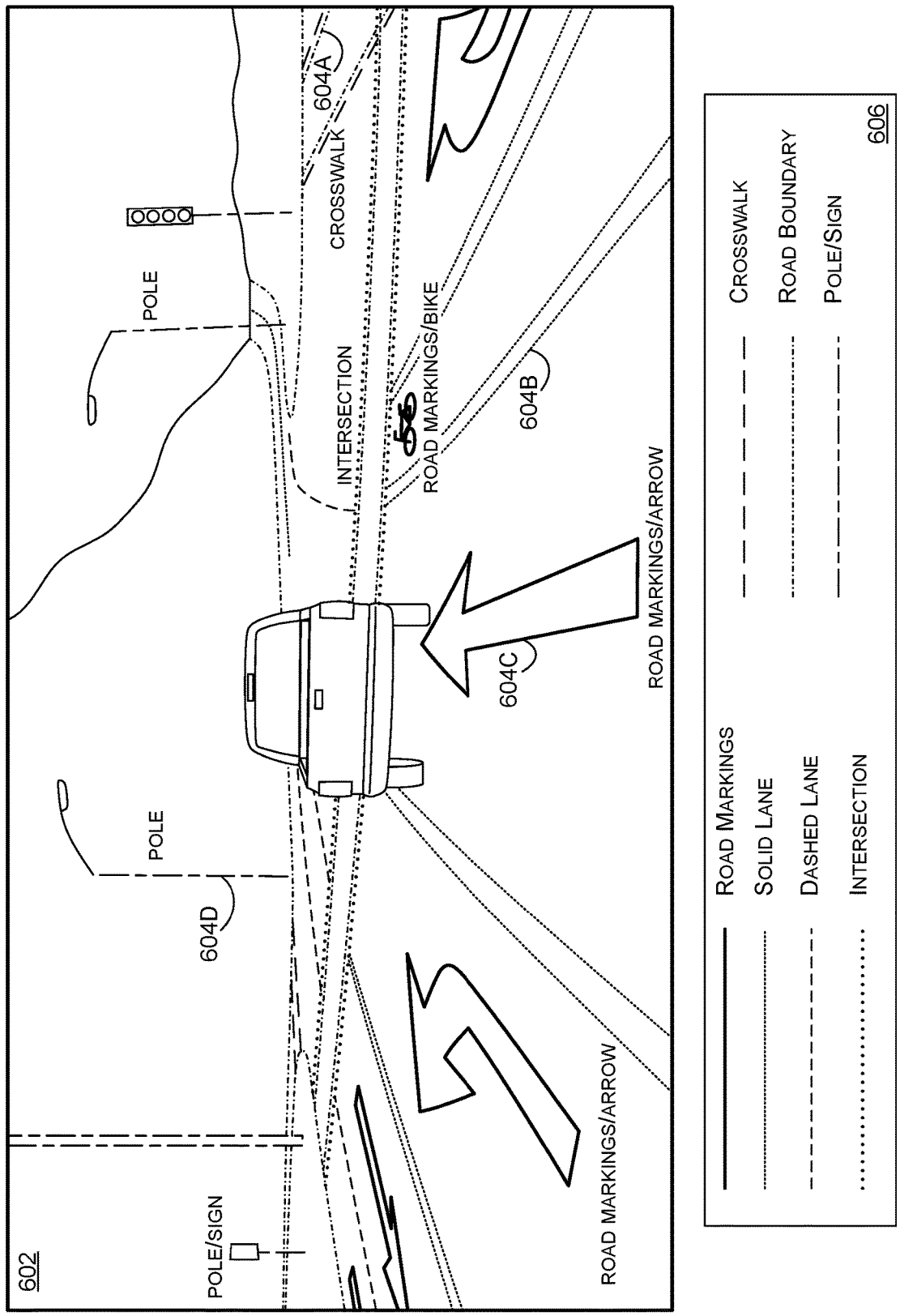
FIG. 6 is an example visualization of ground truth annotations for training a machine learning model for line predictions, data flow diagram illustrating an example process for line predictions using a machine learning model, in accordance with some embodiments of the present disclosure.

As an example, and with respect to FIG. 6, FIG. 6 is an example visualization 602 of ground truth annotations for training a machine learning model for line predictions, in accordance with some embodiments of the present disclosure. The ground truth data 502 may include labels 604 or annotations 604, such as those illustrated in the visualization 602 (e.g., labels 604A-604D). For example, various types of labels or annotations (as indicated by key 606) may be generated for classes of objects in a scene—such as road markings, intersections, crosswalks, road boundaries, poles and signs, and/or other objects—as the ground truth data 502 for association with the image (e.g., represented by training image data 510) in the visualization 602. In further embodiments, different labels and annotations may be generated for sub-classes of objects. For example, road markings may be further distinguished between solid lanes and dashed lanes, single and double lane lines, turn arrows and straight arrows, and/or by color (e.g., white and yellow lane lines); likewise, poles and signs may be further distinguished, in non-limiting examples, between traffic signs, street signs, light poles, etc. The visualization 602 is for example purposes only, and is not intended to be limiting. For example, the process 500 may be used for any application in addition to, or alternatively from, driving applications.

Encoding 504 may be executed on the ground truth data 502 to generate encoded ground truth data 506 for training the machine learning model(s) 104 to predict the pixel distances 108, the angles 110, the line classes 112, and/or the cluster vectors 114. In order to encode the ground truth data 502 to generate the encoded ground truth data 506, in some non-limiting examples, GPU acceleration may be implemented. For example, a parallel processing platform (e.g., NVIDIA's CUDA) may be implemented to parallelize algorithms through several compute kernels for generating the encoded ground truth data 506—thereby decreasing processing time for encoding 504.

Figure 7A:
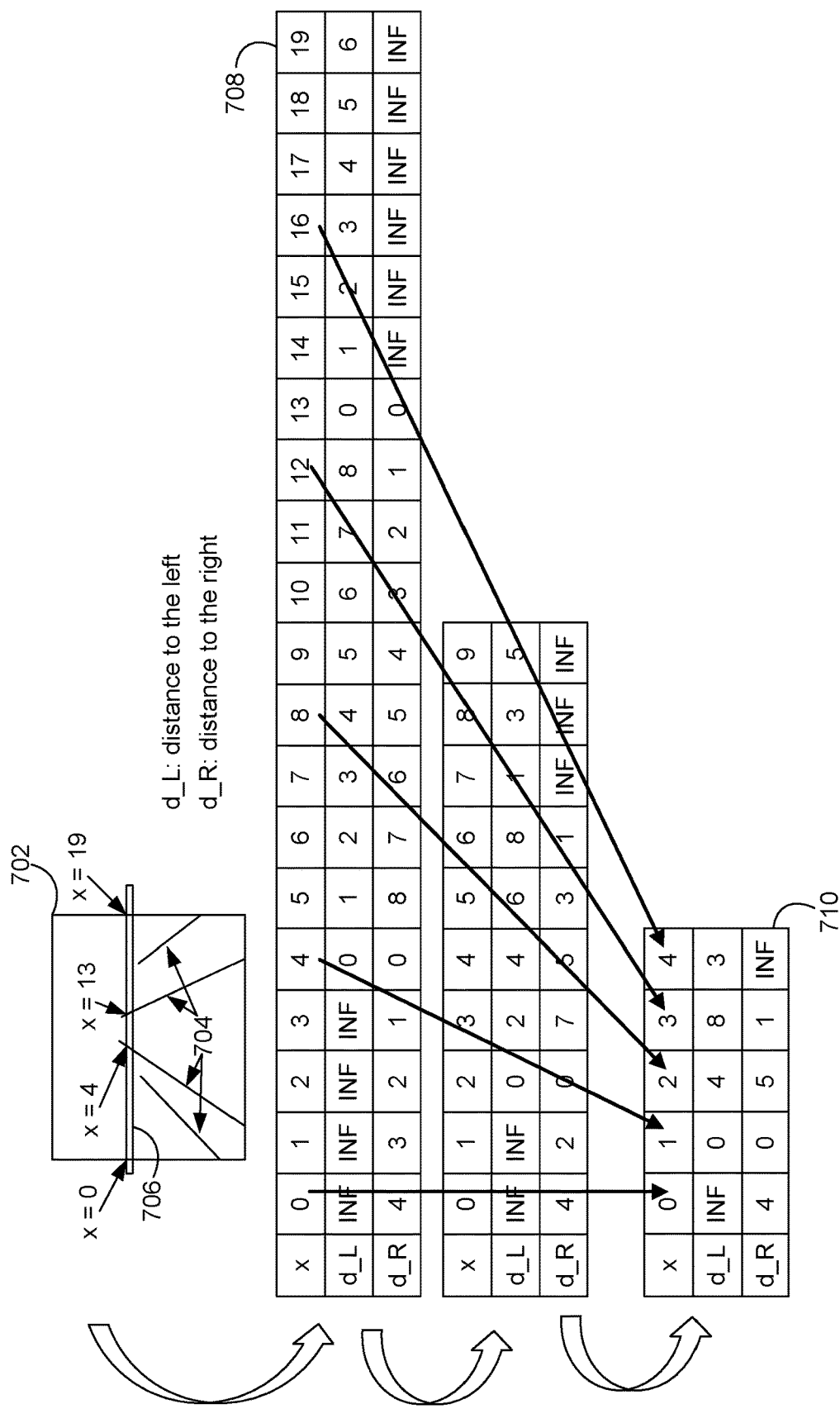
FIG. 7A is an example illustration of an encoding method for preserving spatial information of an input of a machine learning model, in accordance with some embodiments of the present disclosure.

The pixel distances 108 may be encoded in 1D or 2D embodiments, as described herein. For example, the ground truth data 502 may be used to determine the pixel distance 108, from each pixel, to a nearest line pixel (e.g., as determined using the labels or annotations corresponding to lines of the training image data 510). For 1D embodiments, for each pixel in each row of pixels of the image, a distance to a nearest line pixel to the left (d_L) and a distance to a nearest line pixel to the right (d_R) along the row of pixels may be encoded from the ground truth data 502. For example, with respect to FIG. 7A, FIG. 7A is an example illustration of an encoding method for preserving spatial information of an input of a machine learning model, in accordance with some embodiments of the present disclosure. In an image 702, there may be four lines 704. FIG. 7A may be an example of determining and encoding the pixel distances 108 for the four lines 704 along a row of pixels 706 (e.g., that may include 19 pixels in width). This process may be repeated for each row of pixels in the image, and FIG. 7A may provide an example of a single row of pixels 706. At the row of pixels 706, two of the four lines may cross at locations x=4 and x=13. As such, the d_L and d_R values in table 708 may represent the encoded values of the pixel distances 108 at the input resolution for training the machine learning model(s) 104. By encoding the pixel distances 108 for each pixel in the row of pixels, the locations of the line pixels in the input resolution may be preserved even in image domains with reduced resolution that, in effect are tantamount to down sampling. Similar to the non-limiting examples described herein with respect to the process 100, the lower resolution with respect to FIG. 7A may include the equivalent of down-sampling by a factor of four. As a result, every fourth value at the input resolution (e.g., in the table 708) may be preserved at the output resolution (e.g., in table 710). As a result, the pixel distances 108 from the output resolution may be converted back to the input resolution, as described herein at least with respect to FIG. 2A, thus preserving the spatial information of the input resolution despite the lower resolution domain of the output. Because the relative resolution may be lower by a factor of four with respect to FIG. 7A, every fourth pixel (e.g., pixels 0, 4, 8, 12, and 16) may be referred to as anchor points, as those pixels and their associated pixel distances 108 may always be the values output at the output resolution of the machine learning model(s) 104. Where a line pixel does not exist in a row to the left or the right of a current pixel, a value of infinite, or null, may be encoded as the value of the pixel distance 108 for training the machine learning model(s) 104.

For 2D embodiments, for each pixel of the image, a distance to a nearest line pixel in an x direction (e.g., along a width of the image) and a y direction (e.g., along a height of the image) may be encoded as the pixel distances 108 from the ground truth data 502. Similarly to FIG. 7A, every fourth pixel of every row of pixels may be preserved at the output resolution. As such, the remaining pixels after downsampling may be referred to herein as anchor points.

Figure 7B:
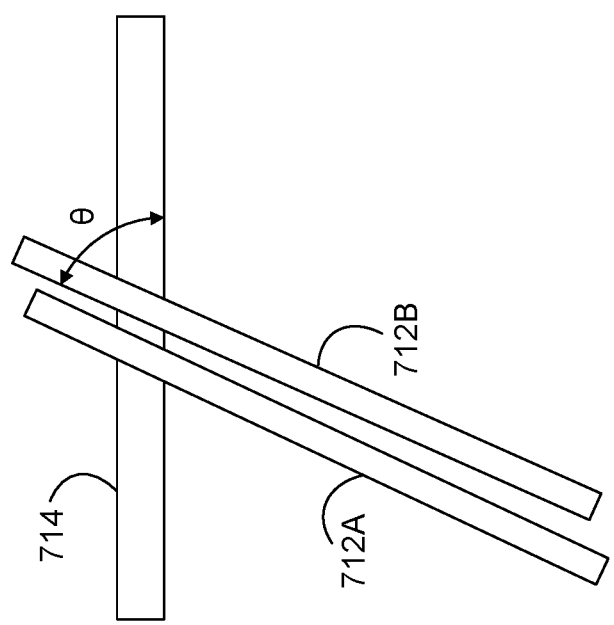
FIG. 7B is an example illustration of and encoding method for training a machine learning model to predict line angles, in accordance with some embodiments of the present disclosure.

The ground truth data 502 may further be used to encode the angles 110 to each of the pixels of the image, where the angles 110 for each pixel correspond to the angle for the nearest line pixel. For example, with respect to FIG. 7B, FIG. 7B includes an example illustration of an encoding method for training a machine learning model to predict line angles, in accordance with some embodiments of the present disclosure. Lines 712A and 712B may represent annotations of lines in an image (represented by the training image data 510) from the ground truth data 502. For example, with respect an image of a road, the lines 712A and 712B may represent lane lines. Virtual line 714 may be a virtual line used to determine the angles 110 for encoding. For example, pixels in a row of pixels may be scanned to determine an angle, θ, for line pixels with respect to the lines 712A and/or 712B. The angles 110 may be angles between 0-360 degrees with respect to the virtual line 714 (e.g., extending horizontally). Per-pixel angle information may be encoded for all line pixels along each row of pixels. Pixel to pixel angle variations may be overcome through angle smoothing techniques, such as those described herein. In some examples, rather than encoding a value between 0-360 degrees, cosine and sine components of the 360 degree angle may be encoded instead.

In some embodiments, a tangent may be encoded for each pixel with respect to a tangent of each line pixel. For example, a tangent value of each line pixel may be encoded to each pixel casting a vote for that line pixel (including self-votes). The tangent value may be used to determine a geometry or direction of the line at each line pixel, which may be used to aid in determining which line pixels belong to a same line within the image.

The ground truth data 502 may be used to encode the label classes 112 to each of the pixels (e.g., corresponding to the line pixel(s) that the pixel casts a vote for). The label classes 112 may each be denoted by a different value, such as 0 for solid lines, 1 for dashed lines, 2 for road boundary lines, 3 for posts, 4 for signs, 5 for road markings, and so on. As such, the ground truth data 502 may indicate the label class 112 for each line in the image (e.g., prior to generating the annotations, a class type annotator or labeler may be selected or applied). As such, with respect to FIG. 6, each of the different label classes 112 may be annotated as ground truth data 502 for training. As described herein, a bit encoding technique may be used to encode the label classes 112, such that semantic information about N different label classes may be encoded using $\log_2(N)$ output label classes. By using only $\log_2(N)$ output label classes, the machine learning model(s) 104 may be more efficient, thereby reducing runtime as well as decreasing compute resources used. As an example, for an N=16 classification problem, using bit encoding, the label class 112 of 5 (e.g., road marking) may be encoded as a four bit sequence [0101], a label class of 7 may be encoded as a four bit sequence [0111], and so on. Depending on the embodiment and the number of label classes 112, the number of bits the machine learning model(s) 104 is trained on may change. For example, where there are only two label classes, there may be only one bit, where there are three classes, there may be two bits, where there are sixteen label classes, there may be four bits, and so on.

As a result of the processes described herein, precise locations of line pixels may be determined using the machine learning model(s) 104, in addition to the angles 110 (and/or directions) of the lines, and the label classes 112 to which the line pixels belong. In order to determine the full geometry of the lines 122 (e.g., to connect the dots), a high dimensional embedding algorithm based on clustering may be employed.

For example, given a pixel at a coordinates $(x_i, y_i)$, the machine learning model(s) 104 may be trained to map this pixel to a high dimensional vector, $H(x_i, y_i)$, in a way that this high dimensional vector is separable from other vectors in the high dimensional space. Although the dimensionality of the space may have an arbitrary integer value, D, where D is less than N, and N represents the total number of output channels, in some embodiments, the number of dimensions in the high dimensional space may be selected. For a non-limiting example, the dimensions in the high dimensional space may be selected to be four, such that D=4. When D=4, $H(x_i, y_i)$ may contain four elements and the mapping between the original pixel $(x_i, y_i)$ and the four channel output corresponding to the elements of $H(x_i, y_i)$ may be learned directly by the machine learning model(s) 104 (e.g., as the cluster vectors 114) through the training data (e.g., the ground truth data 502 and the training image data 510).

By repeating this process for all the pixels in the image (e.g., for each pixel at each $(x_i, y_i)$ location, at the output of the machine learning model(s) 104, a collection of separable D dimensional vectors may be computed (e.g., as the cluster vectors 114). Continuing with the D=4 example, it may be the case that certain subsets of $H(x_i, y_i)$ are sufficiently close to one another to form a cluster of the cluster vectors 114, while others of the vectors may be sufficiently far apart to not be considered part of the same cluster (and perhaps belong to a different cluster of the cluster vectors 114 instead). As such, the machine learning model(s) 104 may be trained to not only map pixels to D dimensional cluster vectors 114, but also to determine which of these cluster vectors 114 form clusters with other of the cluster vectors 114 and how many different clusters there are. This may be important, semantically, because a cluster of the cluster vectors 114 in D dimensional space may correspond to a complete line in the real world (e.g., in world space). Similarly, the total number of the clusters of the cluster vectors 114 may correspond to a total number of lines in the environment within a field of view of the camera(s) and/or sensor(s) at any one time.

For example, to train the machine learning model(s) 104 to predict the clusters of the cluster vectors 114, the cluster data may be encoded as the ground truth data 502 with respect to the training image data 510. In such an example, each line in the training images may be labeled as a cluster (e.g., a label or annotation may be applied with respect to the training image for each line in the training image). The machine learning model(s) 104 may then be trained to treat the high dimensional cluster vectors 114 that are close to each other (e.g. using a thresholding approach) as members of a single cluster, and may be trained to treat the high dimensional cluster vectors 114 that are distanced from each other as members of different clusters. In mathematical terms, and as a non-limiting example, the machine learning model(s) 104 may be trained to minimize the within-cluster variance, $d_{within}$, and to maximize the between-cluster variance, $d_{between}$. A prediction of the number of different clusters is also learned by the machine learning model(s) 104 during training, and each cluster may represent a different line edge. With respect to the output of the clusters of the cluster vectors 114, the machine learning model(s) 104 may be trained to output D channels, as described herein, using one or more loss functions 508, such as those of equations (1) and (2), below:

$$\frac{1}{c_i \vee \sum_{x \in c_i} \max(\| H(x_i, y_i) - \text{mean}(H(x_i, y_i)) \| - d_{within}, 0)^2} \quad (1)$$

$$L_{within} = \frac{1}{K} \sum_{i=1}^{K}$$

$$L_{between} = \frac{1}{K(K-1)} \sum_{j \neq 1} \max \quad (2)$$

$$(d_{between} - \| \text{mean}(H(x_j, y_j)) - \text{mean}(H(x_i, y_i)) \|, 0)^2$$

where $L_{within}$ denotes the within-cluster loss function 508, $L_{between}$ denotes the inter-cluster loss function 508. K is a number of cluster instances in the ground truth data 502, and $c_i$, i=1, 2, 3, . . . is the cluster ID. In some embodiments, the final loss function 508 may be a linear combination of $L_{within}$ and $L_{between}$. The total loss may be compared to a threshold to determine whether the high dimensional cluster vectors 114 belong to the same cluster or different clusters.

Figure 8:
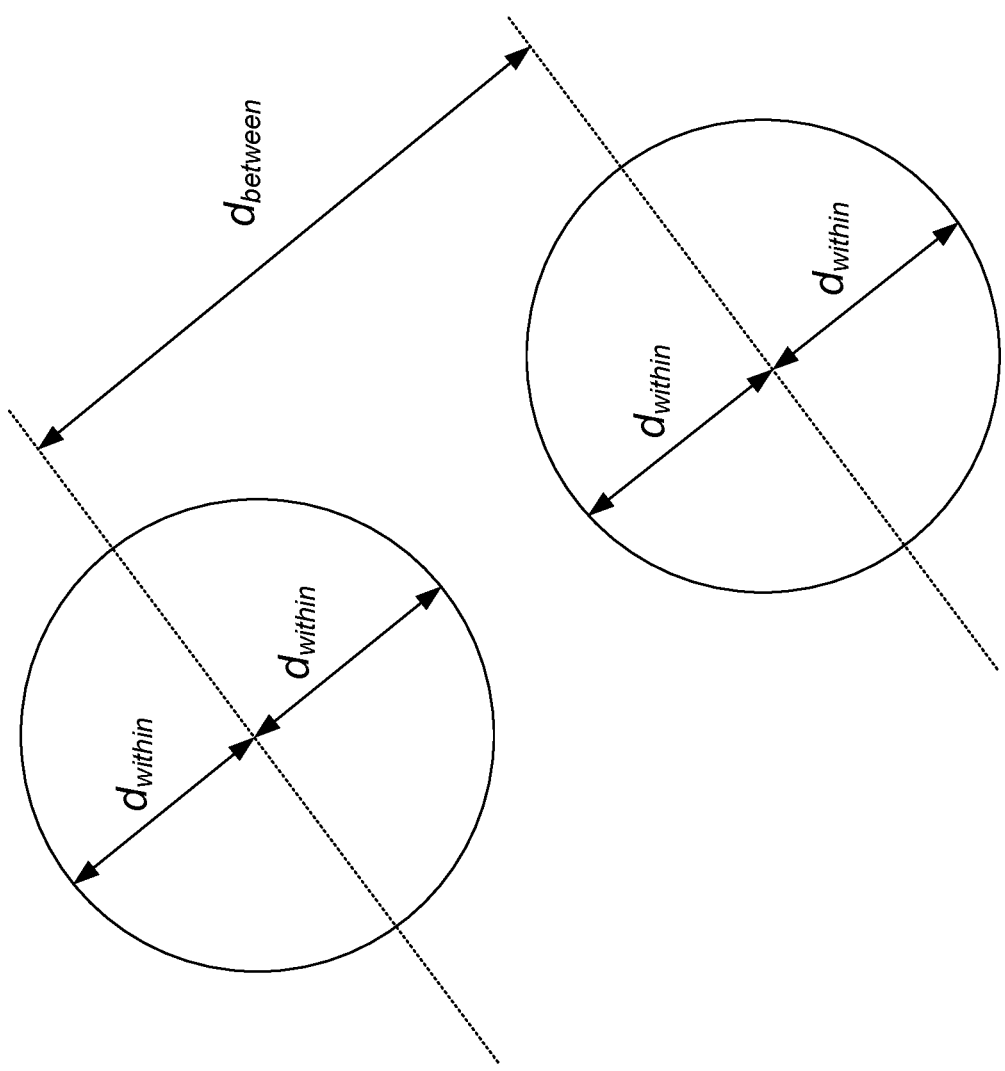
FIG. 8 is example illustration of an encoding method for training a machine learning model to predict line clusters, in accordance with some embodiments of the present disclosure.

With reference to FIG. 8, FIG. 8 is example illustration of an encoding method for training a machine learning model to predict line clusters, in accordance with some embodiments of the present disclosure. As used herein, $d_{between}$ may correspond to a within-cluster variance. For example, as represented in FIG. 8, different cluster vectors 114 may be separable so long as the condition $d_{between} > 4(d_{within})$ is satisfied. When looking at two of the cluster vectors 114, H ($x_i$, $y_i$) and H ($x_j$, $y_j$), for example, if there are no existing clusters, the vector H ($x_i$, $y_i$) may be registered as a first cluster. Alternatively, if there is an existing cluster, a distance (e.g., a Euclidean distance) between the two cluster vectors 114 may be computed, and the distance value may be compared against 2($d_{within}$). If the value is less than 2($d_{within}$), then H ($x_i$, $y_i$) may be added to the existing cluster, and if the value is more than 2($d_{within}$), then H ($x_i$, $y_i$) may be registered as a new cluster. This process may be repeated for each cluster vector 114.

In some embodiments, the high dimensional embedding algorithm using clustering may be executed by performing mean-shift clustering using a kernel radius of $d_{within}$. For example, from any given cluster vector 114, H ($x_i$, $y_i$), the mean-shift operation may be executed until the cluster vector 114 converges. The converged cluster may then be compared to the existing cluster center (or to a center of each existing cluster). If there is no existing cluster, the converged vector may be registered as a cluster. If there is an existing cluster, the distance (e.g., Euclidean distance) between the two vectors may be computed and, if less than 2($d_{within}$), the cluster vector 114 may be registered as belonging to the same cluster. Alternatively, the converted cluster may be registered as a new cluster. This process may be repeated for each of the cluster vectors 114. In some examples, thresholding may be executed based on hyper-parameter optimization.

The loss function(s) 508 may be used to measure loss (e.g., error) in the outputs of the machine learning model(s) 104 with respect to the ground truth data 502 and/or the encoded ground truth data 506 (e.g., error between predictions of the machine learning model(s) 104 as compared to the labels or annotations corresponding to the ground truth data). For example, a gradient descent based loss function, a binary cross entropy loss function, a mean squared error (L2) loss function, an L1 loss function, and/or other loss function types may be used as the loss function(s) 508. In some embodiments, two or more different loss functions may be used. For example, one or more loss functions may be used for each type of output of the machine learning model(s) 104 where there are two or more outputs, or two or more loss functions may be used for a single output type. Where two or more loss functions are used for a single output type (e.g., the high dimensional embedding algorithm), the loss functions may be weighted with respect to one another to generate a weighted loss function. Backward pass computations may be performed to recursively compute gradients of the loss function with respect to training parameters (e.g., weights, biases, etc.), as indicated in the process 500. In some examples, weight and biases of the machine learning model(s) 104 may be used to compute these gradients.

Figure 9:
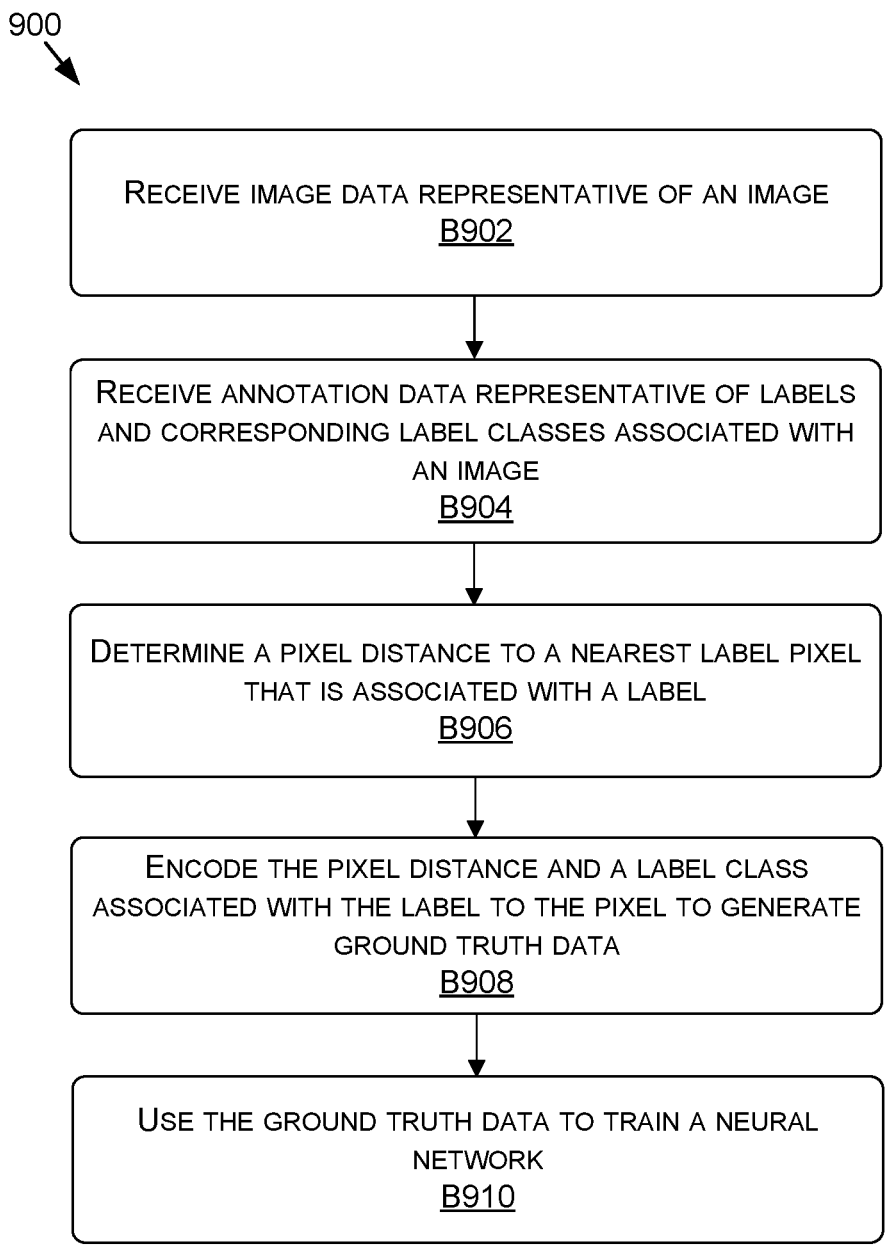
FIG. 9 is a flow diagram showing a method for training a machine learning model to predict lines in an image, in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method 900 may also be embodied as computer-usable instructions stored on computer storage media. The method 900 may be provided by a standalone application, a service or hosted service (standalone or in combination with another hosted service), or a plug-in to another product, to name a few. In addition, method 900 is described, by way of example, with respect to the process 500 of FIG. 5. However, the method 900 may additionally or alternatively be executed by any one system, or any combination of systems, including, but not limited to, those described herein.

FIG. 9 is a flow diagram showing a method for training a machine learning model to predict lines in an image, in accordance with some embodiments of the present disclosure. The method 900, at block B902, includes receiving image data representative of an image. For example, the training image data 510 may be received, where the training image data 510 may represent an image.

The method 900, at block B904, includes receiving annotation data representative of labels and corresponding label classes associated with an image. For example, the ground truth data 502 may be received that corresponds to annotations and/or labels of the lines in the image and the label classes 112.

The method 900, at block B906, includes determining a pixel distance to a nearest line pixel that is associated with a label of the labels. For example, for each pixel in the image, a distance between the pixel and a nearest line pixel may be determined. In some examples, this may include a distance to the left along the row of pixels of the pixel and/or to the right. In other examples, this may include a distance along a row and a distance along a column (e.g., to determine a magnitude) between the pixel and the line pixel.

The method 900, at block B908, includes encoding the pixel distance and a label class associated with the label to the pixel to generate ground truth data. For example, the pixel distance 108 and the label class associated with each pixel may be encoded, during encoding 504, to the pixel as encoded ground truth data 506. In addition to pixel distances and label classes, Classes, angles, distance information, optional clustering information, and/or other information, as described herein, may be encoded to the pixels.

The method 900, at block B910, includes using the first ground truth data and the second ground truth data to train a neural network. For example, the encoded ground truth data 506 may be used to train the machine learning model(s) 104, where the machine learning model(s) 104 may include a neural network (e.g., a CNN), in some examples.

Example Autonomous Vehicle

Figure 10A:
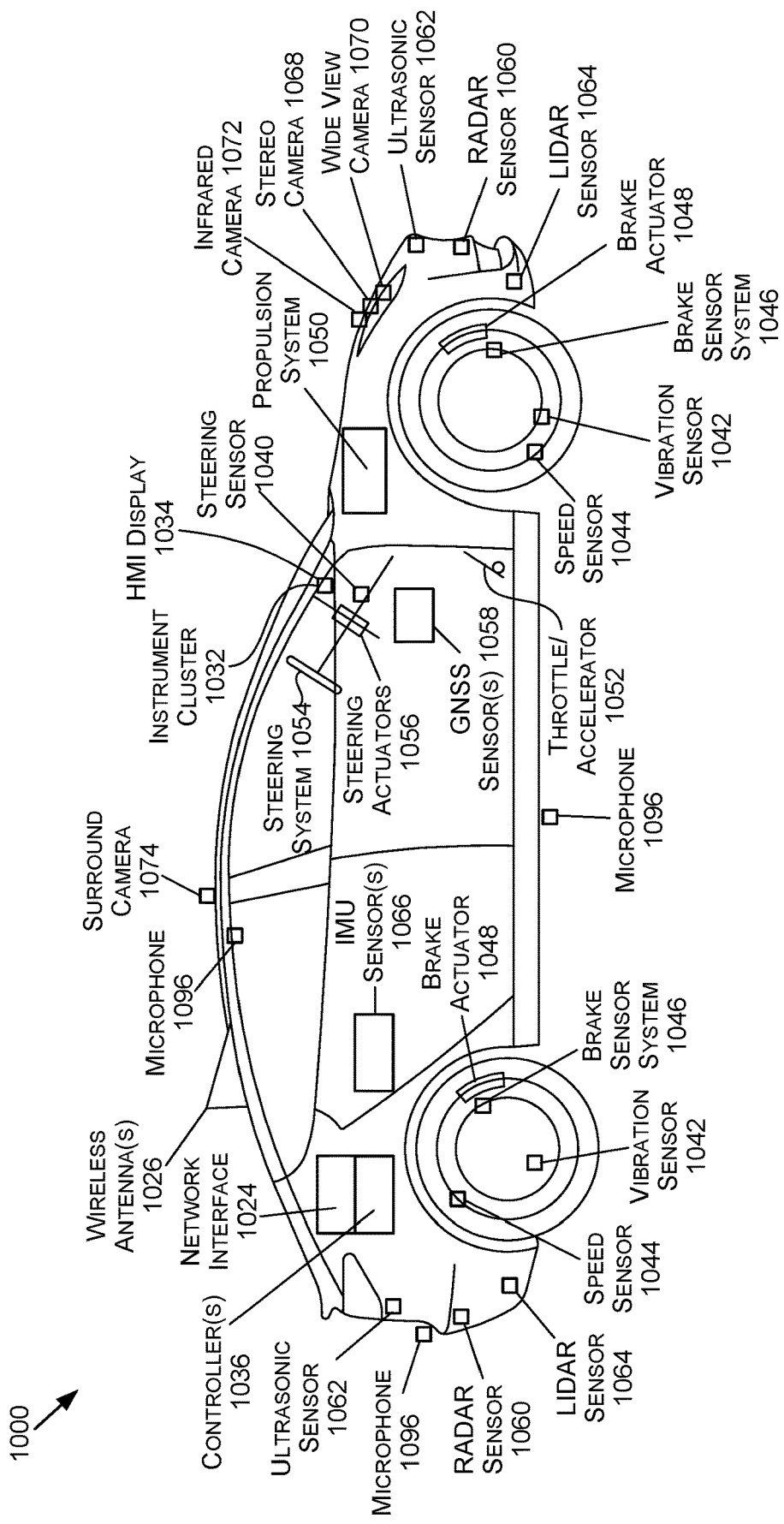
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 10B:
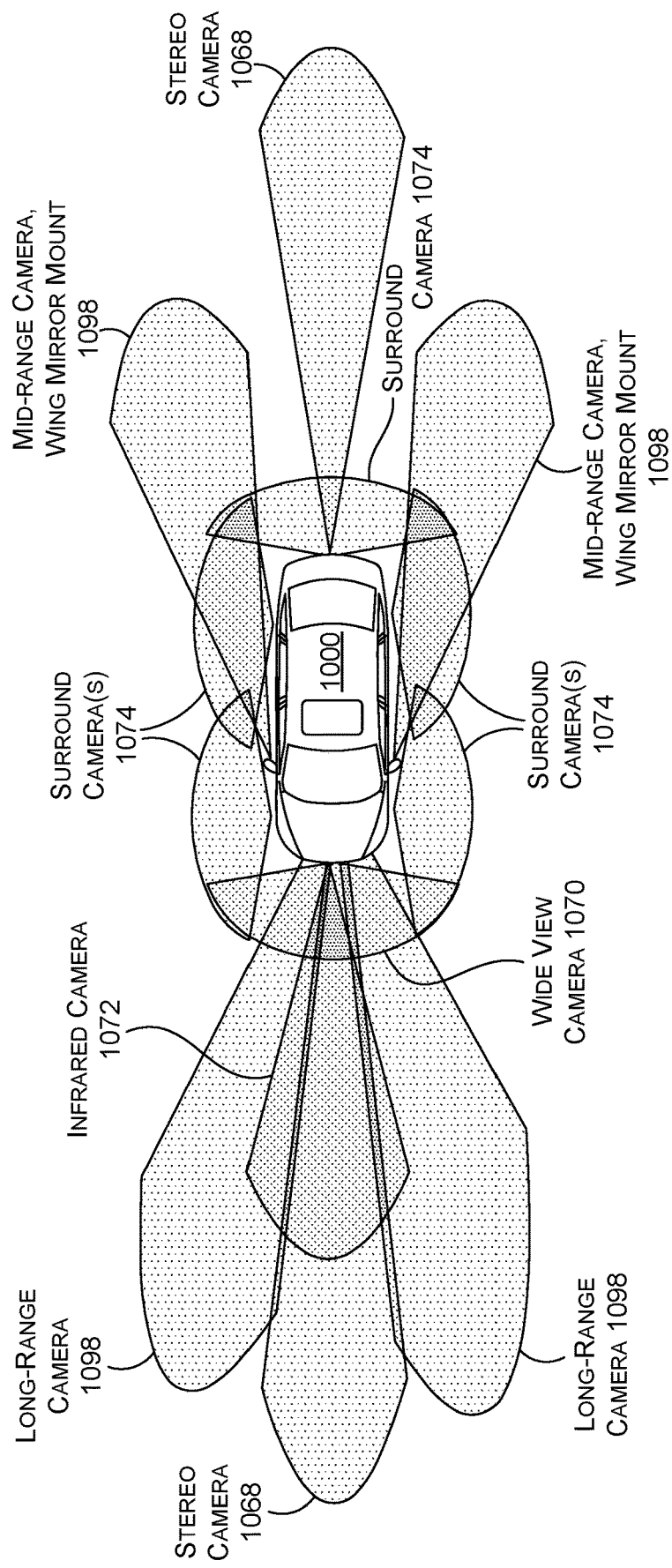
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 1020 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
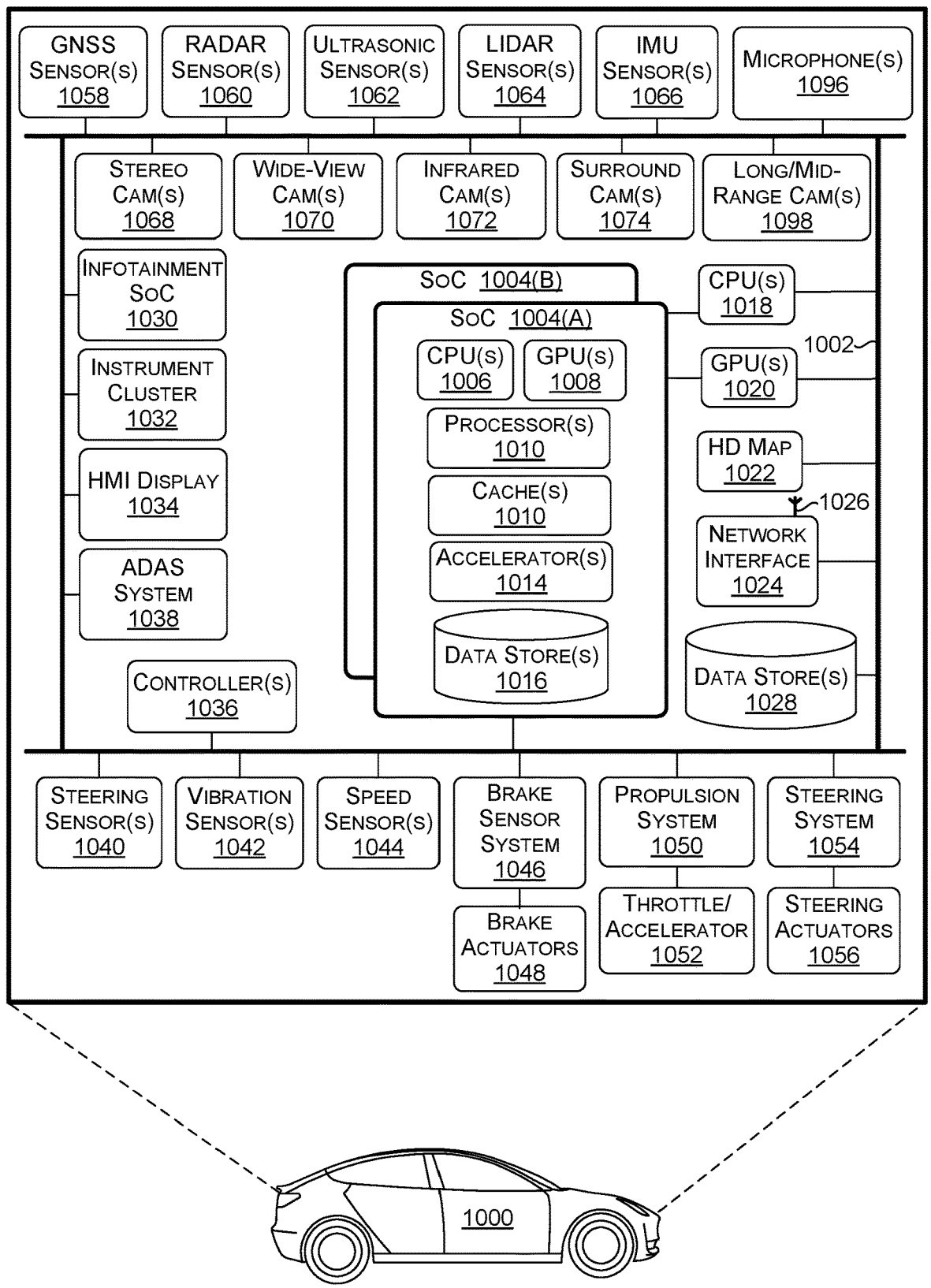
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a realtime ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU (s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio 110 interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various 110 controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS and/or assisted GPS sensors), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060m (front) or 80m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5m, 4m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 1020-degree horizontal and 35-degree vertical field-of-view, with a 200m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
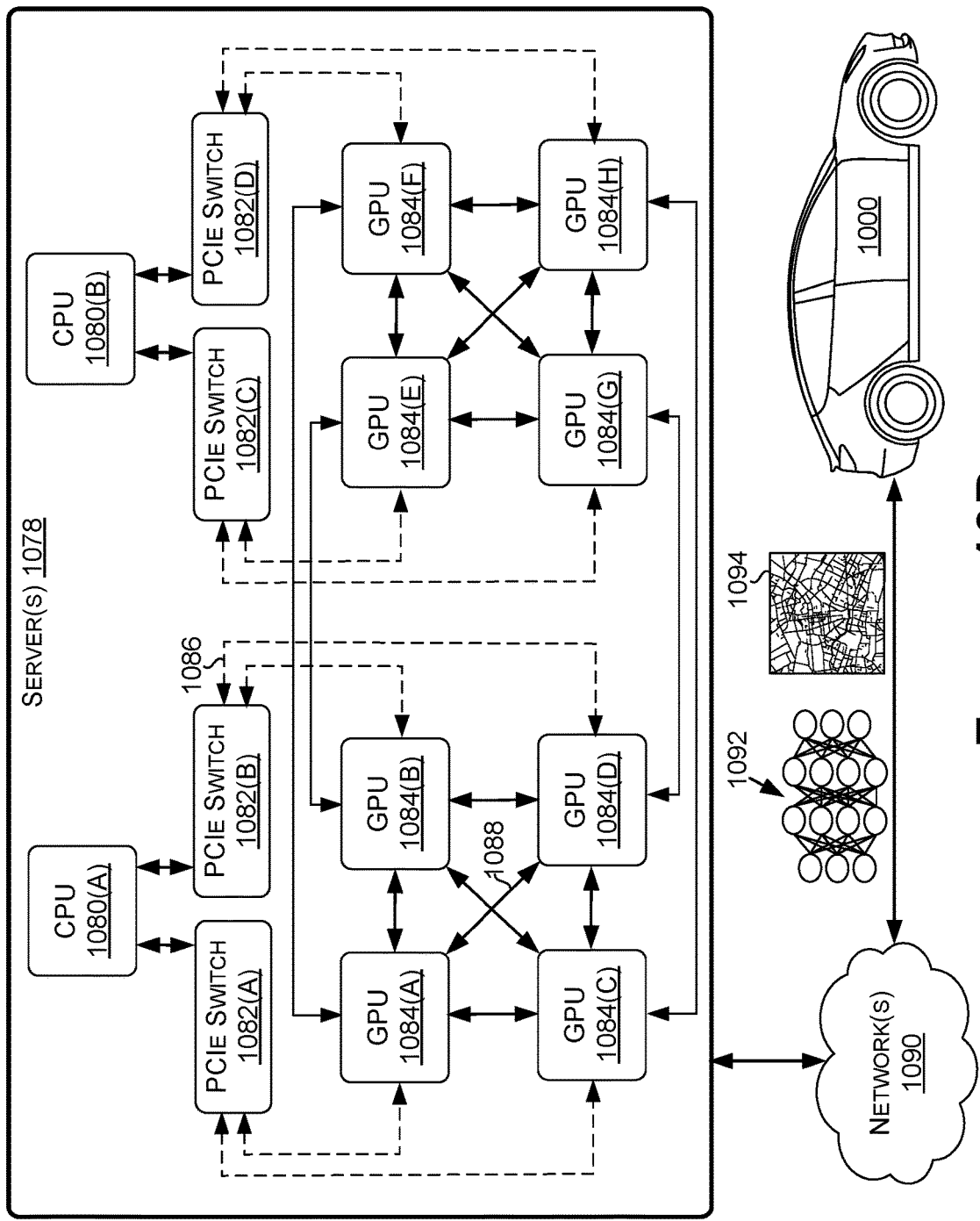
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
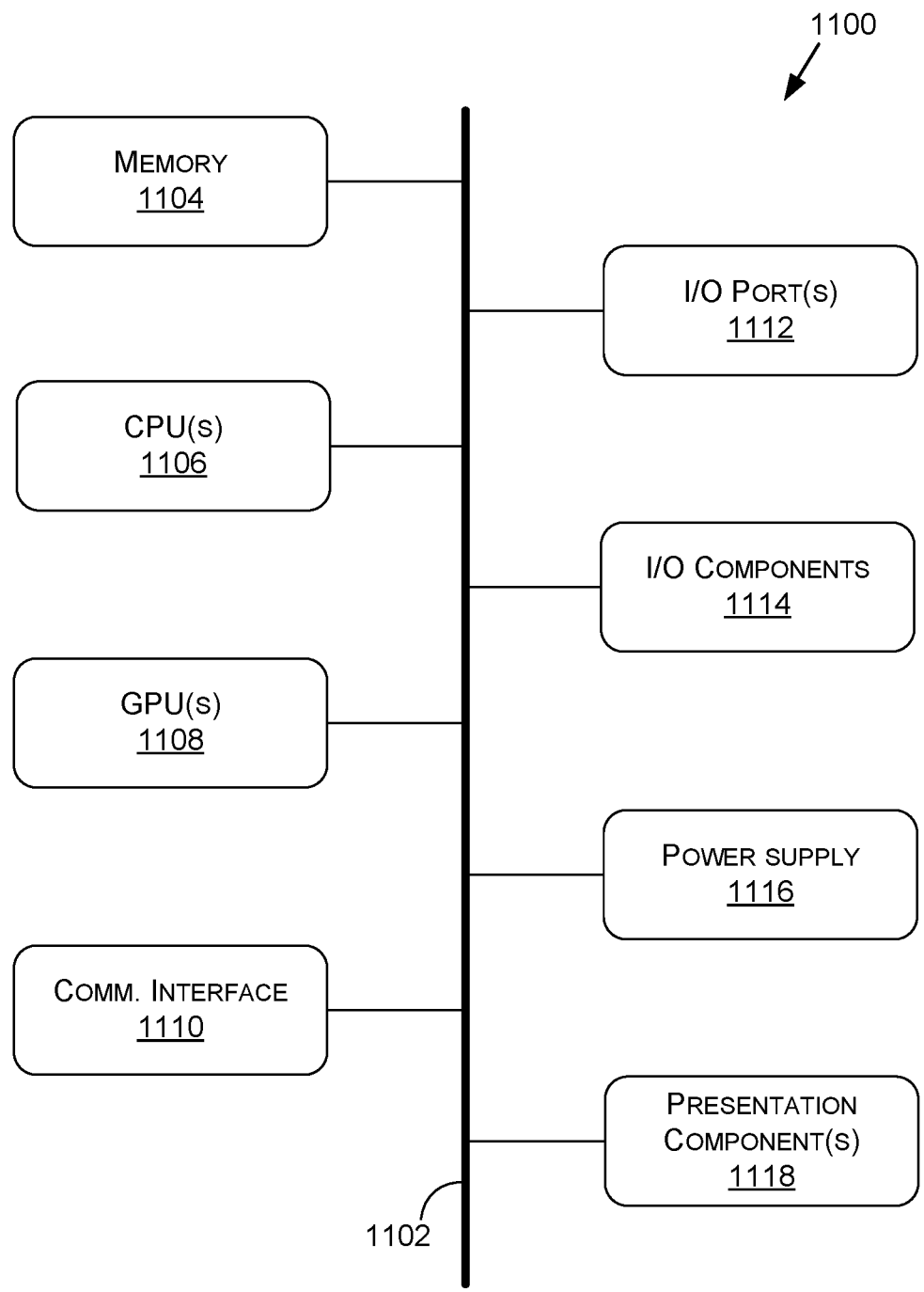
FIG. 11 is a block diagram of an example computing device suitable for use in implementing some embodiments of the present disclosure.

FIG. 11 is a block diagram of an example computing device 1100 suitable for use in implementing some embodiments of the present disclosure. Computing device 1100 may include a bus 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, and one or more presentation components 1118 (e.g., display(s)).

Although the various blocks of FIG. 11 are shown as connected via the bus 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The bus 1102 may represent one or more busses, such as an address bus, a data bus, a control bus, or a combination thereof. The bus 1102 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an ARM processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

The GPU(s) 1108 may be used by the computing device 1100 to render graphics (e.g., 3D graphics). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data. The display memory may be included as part of the memory 1104. The GPU(s) 708 may include two or more GPUs operating in parallel (e.g., via a link). When combined together, each GPU 1108 may generate pixel data for different portions of an output image or for different output images (e.g., a first GPU for a first image and a second GPU for a second image). Each GPU may include its own memory, or may share memory with other GPUs.

In examples where the computing device 1100 does not include the GPU(s) 1108, the CPU(s) 1106 may be used to render graphics.

The communication interface 1110 may include one or more receivers, transmitters, and/or transceivers that enable the computing device 700 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, using one or more neural networks and based at least on image data representative of an image having a first spatial resolution:
      a first output, associated with a second spatial resolution, indicative of one or more locations of a line; and a second output indicative of a classification associated with the line;

determining, based at least on the first output and the second output, the one or more locations of the line in the image and the classification associated with the line; and performing one or more operations based at least on the one or more locations and the classification.

2. The method of claim 1, wherein the one or more neural networks are trained to determine a first number of classifications associated with lines, and wherein the second output includes a bit sequence including a second number of bits that is less than the first number of the classifications.

3. The method of claim 1, wherein the determining the classification associated with the line comprises:

determining that the line is associated with a first value;

determining that a bit sequence of the second output represents a second value; and determining that the first value includes a same value as the second value.

4. The method of claim 1, further comprising:

determining, using the one or more neural networks and based at least on the image data, one or more vectors associated with the line; and determining, based at least on the one or more vectors, a geometry associated with at least a portion of the line.

5. The method of claim 4, wherein the determining the geometry associated with the at least the portion of the line comprises:

mapping the one or more vectors to the one or more locations in the image; and determining, based at least on the mapping, the geometry associated with the at least the portion of the line.

6. The method of claim 4, wherein the one or more vectors include a plurality of vectors, and wherein the determining the geometry associated with the at least the portion of the line comprises:

mapping the plurality of vectors to a plurality of points of the image, the plurality of points of the image corresponding to the line;

clustering the plurality of vectors based at least on one or more distances between points of the plurality of points; and determining, based at least on the clustering, the geometry associated with the at least the portion of the line.

7. The method of claim 1, wherein:

the first output associated with the second spatial resolution comprises one or more distances for one or more second locations associated with the second spatial resolution; and the determining the one or more locations in the image is based at least on the one or more distances and the one or more second locations.

8. The method of claim 1, wherein:

the first output associated with the second spatial resolution comprises one or more distances for one or more second locations associated with the second spatial resolution and one or more angles associated with the one or more second locations; and the determining the one or more locations in the image is based at least on the one or more distances and the one or more angles.

9. A system comprising:

one or more processing units to:

determine, using one or more neural networks and based at least on image data representative of an image at a first spatial resolution:

an output associated with a second spatial resolution and corresponding to a line; and one or more vectors associated with the line;

determine, based at least on the output and the one or more vectors, a geometry of the line; and perform one or more operations associated with a machine based at least on the geometry of the line.

10. The system of claim 9, wherein the geometry associated with the line is determined, at least, by:

mapping the one or more vectors to one or more points of the image associated with the line; and determining, based at least on the mapping, the geometry associated with the line.

11. The system of claim 9, wherein the one or more vectors include a plurality of vectors, and wherein the geometry associated with the line is determined, at least, by:

mapping the plurality of vectors to a plurality of points of the image associated with the line;

clustering the plurality of vectors based at least on one or more distances between points of the plurality of points; and determining, based at least on the clustering, the geometry associated with the line.

12. The system of claim 9, wherein the output associated with the second spatial resolution comprises one or more angles for one or more first points associated with the second spatial resolution.

13. The system of claim 9, wherein the one or more processing units are further to:

determine, using the one or more neural networks and based at least on the image data, a bit sequence associated with the line; and determine, based at least on the bit sequence, a classification associated with the line.

14. The system of claim 13, wherein the one or more neural networks are trained to determine a first number of classifications associated with lines, and wherein the bit sequence includes a second number of bits that is less than the first number of the classifications.

15. The system of claim 13, wherein the determination of the classification associated with the line comprises:

determining that the line is associated with a first value;

determining that the bit sequence represents a second value; and determining that the first value includes a same value as the second value.

16. The system of claim 9, wherein:

the output associated with the second spatial resolution comprises one or more distances for one or more first points associated with the second spatial resolution; and the one or more processing units are further to determine, based at least on the one or more distances and the one or more first points, one or more second points of the image that correspond to the line.

17. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

18. A processor comprising:
one or more processing units to cause performance of one or more operations corresponding to a machine based at least on information associated with a line, the information determined, at least, by determining, based at least on one or more distances between one or more points associated with a first spatial resolution, one or more line points of an image associated with a second spatial resolution, wherein the one or more distances between the one or more points are determined using one or more neural networks and based at least on image data representative of the image.

19. The processor of claim 18, wherein the one or more processing units are further to:
determine, using the one or more neural networks and based at least on the image data, a bit sequence associated with the line; and
determine, based at least on the bit sequence, a classification associated with the line,
wherein the information includes the classification.

20. The processor of claim 18, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *